United States Patent
Koster et al.

(10) Patent No.: US 10,439,910 B2
(45) Date of Patent: Oct. 8, 2019

(54) LOW-LATENCY STREAMING

(71) Applicant: Koninklijke KPN N.V., Rotterdam (NL)

(72) Inventors: Arian Koster, Mijdrecht (NL); Dolf Schinkel, Hillegom (NL); Ray Van Brandenburg, The Hague (NL); Emmanuel Thomas, Delft (NL); Mattijs Oskar Van Deventer, Leidschendam (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 195 days.

(21) Appl. No.: 14/653,849

(22) PCT Filed: Dec. 30, 2013

(86) PCT No.: PCT/EP2013/078126
§ 371 (c)(1),
(2) Date: Jun. 18, 2015

(87) PCT Pub. No.: WO2014/096463
PCT Pub. Date: Jun. 26, 2014

(65) Prior Publication Data
US 2015/0334153 A1    Nov. 19, 2015

(30) Foreign Application Priority Data

Dec. 21, 2012  (EP) ...................................... 12198896
Jul. 18, 2013   (EP) ...................................... 13177087

(51) Int. Cl.
*H04L 29/06*      (2006.01)
*G06F 17/30*     (2006.01)
(Continued)

(52) U.S. Cl.
CPC ............ *H04L 43/08* (2013.01); *G06F 16/951* (2019.01); *H04L 65/4069* (2013.01);
(Continued)

(58) Field of Classification Search
None
See application file for complete search history.

(56) References Cited

U.S. PATENT DOCUMENTS 7,380,028 B2 *   5/2008   Crinon ............. H04N 21/23406
                                                           348/E5.006
7,783,773 B2 *   8/2010   Wu .......................... H04L 65/80
                                                                709/203
(Continued)

FOREIGN PATENT DOCUMENTS

EP   2 530 885 A1   12/2012
JP   2008-527765 A   7/2008
(Continued)

OTHER PUBLICATIONS

Notice of Reasons for Rejection from Japanese Appl No. JP 2015-548677, dated Apr. 8, 2016 (With English Translation).
(Continued)

*Primary Examiner* — Natisha D Cox
(74) *Attorney, Agent, or Firm* — Hamilton, Brook, Smith & Reynolds, P.C.

(57) ABSTRACT

Method and systems for enabling low-latency streaming of segments over at least one network to a client are described wherein said client is configured to request and receive segments from at least one server on the basis of a manifest file. Said method comprises: collecting quality of service information experienced by said client in at least a part of said network and storing said quality of service information in a quality database in said network; sending at least part of said quality of service information to said content processing
(Continued)

device; determining on the basis of said at least part of said quality of service information one or more configuration parameters for a buffer, preferably a play-out buffer; and/or, for a segment request function in said content processing device; and, configuring said buffer and/or, said segment request function in accordance with said configuration parameters.

15 Claims, 14 Drawing Sheets

(51) Int. Cl.
  *H04L 12/26* (2006.01)
  *H04L 29/08* (2006.01)
  *G06F 16/951* (2019.01)

(52) U.S. Cl.
  CPC .......... *H04L 65/604* (2013.01); *H04L 65/608* (2013.01); *H04L 65/80* (2013.01); *H04L 67/32* (2013.01); *H04L 43/0829* (2013.01); *H04L 43/0852* (2013.01); *H04L 65/1059* (2013.01)

(56) References Cited

U.S. PATENT DOCUMENTS

| | | | | |
|---|---|---|---|---|
| 2006/0109856 | A1* | 5/2006 | Deshpande | H04L 29/06027 370/412 |
| 2011/0066673 | A1 | 3/2011 | Outlaw | |
| 2011/0093605 | A1 | 4/2011 | Choudhury | |
| 2012/0117225 | A1* | 5/2012 | Kordasiewicz | H04L 65/1083 709/224 |
| 2012/0265856 | A1* | 10/2012 | Major | H04N 21/2225 709/219 |
| 2013/0067109 | A1* | 3/2013 | Dong | H04L 65/4069 709/231 |
| 2013/0151673 | A1* | 6/2013 | Gouache | H04L 65/60 709/219 |
| 2013/0159498 | A1* | 6/2013 | Funge | H04L 65/80 709/224 |
| 2013/0286868 | A1* | 10/2013 | Oyman | H04W 24/06 370/252 |
| 2013/0290493 | A1* | 10/2013 | Oyman | H04W 4/70 709/219 |
| 2014/0089993 | A1* | 3/2014 | Huysegems | H04N 21/44209 725/86 |
| 2014/0379871 | A1* | 12/2014 | Van Brandenburg | H04L 65/4084 709/219 |
| 2015/0134784 | A1* | 5/2015 | De Vleeschauwer | H04L 65/605 709/219 |

FOREIGN PATENT DOCUMENTS

| | | |
|---|---|---|
| WO | WO 2011/047335 A1 | 4/2011 |
| WO | WO 2013/004260 A1 | 1/2013 |
| WO | WO 2013/004260 A8 | 1/2013 |

OTHER PUBLICATIONS

3rd Generation Partnership Project; Technical Specification Group Services and System Aspects; Transparent end-to-end Packet-switched Streaming Service (PSS); Progressive Download and Dynamic Adaptive Streaming over HTTP (EGP-DASH) (Release 11), 3GPP TS 26.247 V11.0.0, Sep. 12, 2012.
Truong, Cong Thang, et al., "Bandwidth Information for DASH," MPEG Meeting, International Organisation for Standardisation, Organisation Internationale De Normalisation, Coding of Moving Pictures and Audio, ISO/IEC JTC1/SC29/WG11, Jan. 2011.
3GPP TSG-SA4 #66, "Justification for MPD-Awareness in QoS Support for DASH," Intel Corporation (UK) Ltd., 3rd Generation Partnership Project (EGPP), Korea, Nov. 7-11, 2011.
Notification of Transmittal of the International Search Report and the Written Opinion of the International Searching Authority, PCT/EP2013/078126, dated Jan. 23, 2014.
European Search Report, EP 12198896.8, dated Mar. 8, 2013.
European Search Report, EP 13177087.7, dated Dec. 9, 2013.
Stockhammer, T., et al., "Text of ISO/IEC 23001-6: Dynamic adaptive streaming over HTTP (DASH)," MPEG Meeting; International Organization for Standardization, Organisation Internationale De Normalisation, Coding of Moving Pictures and Audio, ISO/IEC JTC1/SC29/WG11, Oct. 2010.
Tokumo, Y., et al., "DASH: Study on Partial Availability of Segment for Low-Latency Live Streaming," ISO/IEC JTC1/SC29/WG11, MPEG2012/M25839, Stockholm, Sweden (Jul. 2012).
Giladi, A., "Low Latency Live Delivery in DASH," ISO/IEC JTC1/SC29/WG11, MPEG2012/M26652, Geneva, Switzerland (May 2012).
Tokumo, Y, et al., "DASH: On Low-Latency Live Streaming (CE-LLL)," ISO/IEC JTC1/SC29/WG11, MPEG2012/M26678, Shanghai, China (Oct. 2012).
Yue, R., "On Low-Latency Live Streaming," ISO/IEC JTC1/SC29/WG11, MPEG2012/M26763, Shanghai, China (Oct. 2012).
Stockhammer, T., "Consideration for CE on Low-Latency Live Streaming," ISO/IEC JTC1/SC29/WG11, MPEG2012/M27200, Shanghai, China (Oct. 2012).
Streeter, K. and Swaminathan, V., "On Low-Latency Live Streaming with MPEG-DASH," ISO/IEC JTC1/SC29/WG11, MPEG2012/Mxxxx, Shanghai, China (Oct. 2012).
Swaminathan, V. and Wei, S., "Low Latency Live Video Streaming Using HTTP Chunked Encoding," IEEE, 13th International Workshop on Multimedia Signal Processing (2011).
Stockhammer, T., "Technologies Under Consdieration for ISO/IEC 23009-1 Dynamic Adaptive Streaming over HTTP," ISO/IEC JTC1/SC29/WG11, MPEG2011/N12682, Geneva, Switzerland (Nov. 2011).

* cited by examiner

```
<MPD                                                                        302
    type="static"                                                           304
    mediaPresentationDuration="PT3256S"
    profiles="urn:mpeg:dash:profile:isoff-on-demand:2011">                  308
    <LatencyMode type="regular">                                      314   310
        minBufferTime="PT5.0S"                                        316
        suggestedPresentationDelay ="1.0S"
        segmentStartOffset=3                                          324
    </LatencyMode>
    <LatencyMode type="low-latency">                                  318   312
        minBufferTime="PT1.0S"                                        320
        suggestedPresentationDelay ="0.0S"
        segmentStartOffset=1                                          322
    </LatencyMode>                                                    326

<BaseURL>http://cdn1.example.com/</BaseURL>
    <Period>
    ...
    </Period>
</MPD>
```

Metrics reporting

```
GET /bufferlevel?t=1370701285&level=1234 HTTP/1.1
Host: metrics.media.com
User-Agent: DASH Client v 1.0
[blank line here]
```
1001

```
POST /bufferlevel HTTP/1.1
Host: metrics.media.com
Content-Type: application/x-www-form-urlencoded
User-Agent: DASH Client v 1.0
Content-Length: 23 t=1370701285&level=1234
```
1002

Fig. 10

Metrics reporting

```
PUT /bufferlevel/client1_1370701285.json HTTP/1.1
Host: metrics.media.com
Content-Type: application/json
User-Agent: DASH Client v 1.0
Content-Length: 88
{
    "BufferLevel": {
        "t": 1370701285,
        "level": 1234
    }
}
```
1103

```
PUT /bufferlevel/client1_1370701285.xml HTTP/1.1
Host: metrics.media.com
Content-Type: application/xml
User-Agent: DASH Client v 1.0
Content-Length: 126

<?xml version='1.0' encoding="utf-16"?>
<BufferLevel>
    <t>1370701285</t>
    <level>1234</level>
</BufferLevel>
```
1104

Fig. 11

Metrics reporting

```
{
    "BufferLevel": {
        "t": 1370701285,
        "level": 1234
    }
}
```
1205

```
<?xml version='1.0' encoding="utf-16"?>
<BufferLevel>
    <t>1370701285</t>
    <level>1234</level>
</BufferLevel>
```
1206

Fig. 12

```
<MPD
type="static"
mediaPresentationDuration="PT3256S"
minBufferTime="PT1.2S"
profiles="urn:mpeg:dash:profile:isoff-on-demand:2011">

<QoSParameters>
    <MinGuaranteedBandwidth>10000000</MinGuaranteedBandwidth>
    <MaxGuaranteedBandwidth>20000000</MaxGuaranteedBandwidth>
    <PacketLossRateInPercent>0.1</PacketLossRateInPercent>
    <Delay>100</Delay>
    <Jitter>10</Jitter>
</QoSParameters>

<Period>
...
</Period>
</MPD>
```

Fig. 13

LOW-LATENCY STREAMING

This application is the U.S. National Stage of International Application No. PCT/EP2013/078126, filed Dec. 30, 2013, which designates the U.S., published in English, and claims priority under 35 U.S.C. §§ 119 or 365(c) to European Application No. 13177087.7, filed Jul. 18, 2013 and European Application No. 12198896.8, filed Dec. 21, 2012.

FIELD OF THE INVENTION

The invention relates to low-latency streaming, and, in particular, though not exclusively, to a method and a system for enabling low-latency streaming of segments to a client, a configuration for enabling low-latency streaming to a client, a client and a database structure for use in such system and a computer program product for using such method.

BACKGROUND OF THE INVENTION

With the growing popularity of Internet video and Internet TV, there is an increasing need for adaptive streaming solutions that allow continuous playback and best user experience under varying network conditions. The concept of adaptive streaming is based on the idea to adapt the bandwidth required by the video stream to the bandwidth available on the network path between the streaming source and the client, wherein the bandwidth is adapted by changing the bit-rate (i.e. the quality) of the video stream.

Currently a number of HTTP-based adaptive streaming (HAS) protocols have been developed and best practises of these solutions are currently condensed in an emerging ISO standard ISO/IEC 23001-6 which is referred to as the MPEG Dynamic Adaptive Streaming over HTTP (MPEG DASH). In HAS solutions a content stream is usually partitioned into segments (also referred to as "chunks") wherein each of these segments may be encoded in different quality levels (representations). A content delivery network (CDN) is typically used to efficiently deliver segments to a large number of content processing devices.

The segments and their different representations are described in a so-called manifest file, which may comprise information about the segments in the stream (segment identifiers, location, play-out time, etc.) and the temporal relation between different segments in the stream. A client in a content processing device may use a manifest file to request segments from the network and process the segments for play-out. The client may be configured to switch between different representations depending on network conditions.

MPEG DASH and the other adaptive streaming solutions have been developed for delivery over unmanaged (best effort) networks and the Internet. In order to cope with unexpected jitter and congestion, and in order to reduce the risk of a buffer underrun, the buffering performed at the client is substantial compared to the total end-to-end delay between the source and the play-out of the content processing device.

HAS clients typically use a (preconfigured) play-out buffer of at least three complete segments before play-out is started. The buffer increases linearly with the segment size and therefore easily reaches 30 seconds or more. Moreover, in order to reduce the risk that not sufficient segments are available to fill the play-out buffer, the client is configured such that the first segment that is going to be requested by the client (upon joining the streaming event) will be a segment that is made available earlier by the streaming source (typically three segments earlier) than the segment that has been made available by the streaming source upon joining the streaming event.

Hence, a substantial latency (delay) exists between the play-out of a live streaming event by a HAS client and the play-out of the live stream by other content processing devices that are based on other transport mechanisms such as conventional broadcast or multicast streaming.

For the delivery of content, in particular live content, over managed networks (e.g. a TV channel), it however is desired to have approximately the same play-out time of the content on different content processing devices (e.g. TVs, STBs, tablets, smart phones, etc.), which may receive said content via different transport mechanisms (e.g. DVB-S, DVB-C, radio and MPEG DASH).

Typically, synchronized play-out between different content processing devices may be achieved by an inter-destination media synchronization (IDMS) technique. IDMS is based on delaying play-out of all receivers to the most-delayed receiver such that synchronized play-out is achieved.

The problem with delaying all other receivers to be in line with a HAS streaming device is that in current HAS implementations play-out delays may be in the order of tens of seconds. Hence, achieving synchronized play-out means that all other devices need to be delayed by the same amount. Delaying a media signal for tens of seconds in a wide variety of devices may however create unforeseen problems. For example, a regular set-top box (STB) configured for receiving and decoding a DVB signal may have insufficient memory to store the DVB stream for half a minute. Hence, an IDMS-synchronized social TV service (e.g. "watching apart together") may not be feasible between a regular STB and a HAS client.

Further, in live streaming applications and streaming applications that allow user interaction, it is desired and—in some cases—even stipulated by law, to have a maximum allowed end-to-end delay for the delivery and presentation of the media signal.

From the above it follows that the play-out delays introduced by HAS streaming seriously degrade the user experience and blocks large-scale commercial application of HAS streaming.

Hence, there is a need in the art for improved methods and systems for low-latency adaptive streaming that allows for optimal low-latency play out while providing a high user experience. In particular, there is a need in the art for methods and systems that allow for low-latency adaptive streaming of content to heterogeneous devices and delivery schemes.

SUMMARY OF THE INVENTION

It is an objective of the invention to reduce or eliminate at least one of the drawbacks known in the prior art. In one aspect the invention may relate a method for enabling low-latency streaming of segments via a network to a client, preferably a HAS (HTTP-based adaptive streaming) client, in a content processing device, said client being configured to request and receive segments from a server system on the basis of a manifest file, wherein said method may comprise: a monitoring system in said network collecting quality metrics associated with one or more paths between said client and one or more streaming servers in said server system and storing said quality metrics in a quality database, preferably a Client Access-line Quality Database (CAQD) in said network; and/or providing the content processing device with at least part of said stored quality metrics or with quality of service information determined on the basis of at least part of said stored quality metrics and/or one or more configuration parameters, and/or; on the basis of at least part of said quality metrics, or said quality of service information or said configuration parameters, a configuration module in said content processing device configuring a buffer, preferably a play-out buffer, in said content processing device; and/or, a segment request function in said content processing device.

The invention allows a client (comprised in a content processing device) to access a quality database containing quality metrics associated with one or more streaming paths between said client and one or more streaming servers in said server system. The quality metrics are measured network parameters, including home or residential network parameters, and measured device parameters that are collected by a monitoring system and stored in a quality database. The quality metrics may be directly accessed by the content processing device (e.g. provided/sent to the content processing device) and be used by the configuration module. Alternatively, on the basis of the history of (at least part of) the collected quality metrics an, preferably expected, QoS level may be determined. This QoS level may preferably be determined in the network, by the monitoring system or another network entity with access to the quality metrics. Subsequently this QoS level may be sent to the content processing device. Alternatively the quality metrics may be provided (transmitted) from the network to the client, in which case this QoS level may be determined by the client on the basis of the received quality metrics. This information (e.g. the QoS level) may be used by the HAS client (through the configuration module) in order to configure the buffer and/or the segment request function when it wants to join a (live) streaming event. Alternatively the quality metrics may be used directly, without the intermediate step of determining an expected QoS level, by the configuration module to configure the buffer or the segment request function.

When content is streamed over a managed network (e.g. with a guaranteed bandwidth), there will be less congestion and less variations in latency present when compared to a situation wherein content is streamed over an unmanaged network (such as the public Internet). In the case of streaming content over a managed network, large buffer size settings for avoiding buffer underrun are therefore no longer required. A QoS level is thus an indication of the quality (e.g. stability) of a streaming path used to stream segmented content.

Hence, when the quality metrics of the streaming path indicate that a certain QoS level may be expected, the buffer size in the content processing device may be reduced (or increased) and a first segment for play-out may be requested that is relatively close (or relatively far away) to (from) the segment that was available at the moment the HAS client jointed the streaming session. This way, the difference in the play-out delay between content processing devices using HAS clients and content processing devices using other streaming clients, e.g. DVB, in a network with a high QoS level may be significantly reduced.

In an embodiment, said method may comprise determining one or more configuration parameters for said configuration module on the basis of said at least part of said quality metrics.

In an embodiment, said one or more configuration parameters may comprise at least one buffer size parameter, for determining the size of the buffer before play-out of data in said buffer is started. In one embodiment, the minBufferTime parameter as defined in the MPEG DASH standard met be used to determine the size of the buffer.

In an embodiment, said one or more configuration parameters may comprise at least one segment request parameter, preferably a segmentStartOffset parameter, for determining the first segment selected from the segments identified in said manifest file that the segment request function will request from said streaming server.

The quality metrics associated with the streaming path, may represent (or be indicative of) a certain QoS level of the streaming path, may be used to determine (configuration) parameters which may be used by the configuration module in the client device (i.e. content processing device, to configure the buffer size and/or segment request function. The minBufferTime parameter is a known parameter in MPEG DASH so the invention may be easily implemented on the basis of a conventional HAS client (device).

In an embodiment, the method may comprise determining quality of service information on the basis of said quality metrics, said quality of service information defining one or more QoS levels, wherein a QoS level is associated with one or more predetermined configuration parameters for (use by) said configuration module. In an embodiment, said one or more QoS levels may comprise at least at least a low latency level associated with one or more (preconfigured) configuration parameters for configuring the HAS client in a low-latency mode (i.e. small buffer size, small segment offset start) and a high latency level (also called 'regular' mode) associated with one or more (preconfigured) configuration parameters for configuring the client in a high-latency ['regular'] mode (i.e. large buffer size, large segment offset start). Hence, the quality of service information may be associated with different sets of configuration parameters that may be preconfigured in the client. This way, a certain (low, medium, high) latency mode of the HAS client may be selected by sending a message comprising the expected QoS level (mode) to the configuration module.

In an embodiment, said at least part of said one or more configuration parameters may be determined by said monitoring system and stored in said quality database.

In another embodiment, said quality of service information may be determined by said monitoring system and stored in said quality database. In another embodiment, said at least part of said quality metrics, said one or more configuration parameters and/or said quality of service information may be sent to said content processing device. In these embodiments, the monitoring system may be configured to determine one or more configuration parameters or quality of service information on the basis of the quality metrics. Alternatively another network entity (e.g. a streaming server, a network node comprising the request routing function, the network node responsible for producing or updating a manifest file, and/or for setting up a HAS control channel to the content processing device) which may be an entity separate from the monitoring system, may determine these parameters on the basis of quality metrics stored in the database. These configuration parameters may be sent to the client. Processing (part of) the quality metrics in the network (e.g. the monitoring server) thereby saving processing power at the client-side, may save processing time at the client-side.

In an embodiment, the method may comprise at least one of: a client requesting at least part of a manifest file or a manifest file update from said server system; said server system retrieving said at least part of said quality metrics, said one or more configuration parameters and/or said quality of service information from said quality database; and, said server system sending at least part of a manifest file comprising said at least part of said quality metrics, and/or said one or more configuration parameters and/or said quality of service information to said client. Hence, the quality metrics, the QoS info and/or the configuration parameters may be sent to the client in a manifest file. This way, the information is sent to the client at the moment the HAS client needs to be configured, i.e. at the moment the client wants to join the streaming session.

In an embodiment, at least part of said quality metrics, said one or more configuration parameters and/or said quality of service information is sent over separate communication channel to the client or to the configuration module. In an embodiment, the communication channel may be established between the monitoring system (or the quality database associated with the monitoring system) on the basis of location information, e.g. an URL or URI, associated with the monitoring system in the manifest file. Alternatively such communication channel may be established between another network entity (node) configured to communicate with the content processing device, and the content processing device.

In an embodiment, the communication channel may be (HAS) streaming control channel, preferably a Websocket-based streaming control channel. In an embodiment, said method may comprise: providing said client with channel set-up information for setting up a (bi-directional) streaming control channel between said server system and said client, preferably said streaming control channel being a Websocket streaming control channel; establishing said (bi-directional) streaming control channel on the basis of said channel set-up information. An HTTP-based (Websocket) streaming control channel allows a server in the network to send the HAS client messages e.g. a manifest update request or a quality of service request during the streaming of segments over the streaming path. Further, in embodiment, the HAS streaming control channel may be configured on the basis of channel set-up information that is sent via a manifest file to the client.

In an embodiment said method may comprise: at least a first monitoring agent in said content processing device collecting first metrics associated with said content processing device; and/or, at least a second monitoring agent in said network collecting second metrics associated with at least part of said network; on the basis of said first and/or second metrics said monitoring system determining quality metrics associated with one or more paths between said one or more streaming servers in said server system and said client; and, storing said quality metrics in said quality database.

Hence, an end-to-end monitoring system may be used that is configured to collect in real-time QoS (Quality of Services) and QoE (Quality of Experience) metrics (hereafter referred to as quality metrics) from clients and the network. When locating the monitoring system in an Internet Service Provider (ISP) network, the quality metrics may be used to determine quality of service information associated with one or more streaming paths between the client and one or more streaming servers.

The monitoring system may be configured to distinguish between different devices used in a home network, thereby also taking into account sources packet loss in the home network, fluctuations in load of het home-network, terminal capabilities, available bandwidth within a home-network. This way, different HAS streaming devices, e.g. a television and wireless mobile devices such as an electronic tablet, connected to the same home gateway may be configured on the basis of different quality metrics.

In an embodiment, the manifest file may comprise information regarding one or more (for example low, medium and/or high, or alternatively 'low' and 'regular') latency modes, which are available to the client. In an embodiment each latency mode may be associated with a set of configuration parameters.

In a further aspect, the invention may relate to a content delivery system for enabling low-latency streaming of segments over at least one network to a content processing device, wherein said system may comprise: a content processing device comprising a client, preferably a HAS client, wherein said client is configured to request and receive segments from one or more streaming servers on the basis of a manifest file;

said content processing device, preferably said client in said content processing device, further configured for being provided with at least part of said stored quality metrics or with quality of service information determined on the basis of at least part of said stored quality metrics and/or one or more configuration parameters, a monitoring system configured for collecting quality metrics associated with associated with one or more paths between said client and said one or more streaming servers and storing said quality metrics in a quality database in said network; and, a configuration module in said content processing device for configuring a buffer, preferably a play-out buffer, in said content processing device; and/or, for configuring a segment request function in said content processing device on the basis of at least part of said quality metrics, and/or said quality of service information, and/or said configuration parameters.

In a yet a further aspect, the invention may relate to configuration module for use in a content processing device, said configuration module being configured for enabling low-latency streaming to a client, preferably a HAS client, in said content processing device, wherein said client is configured to request and receive segments from one or more streaming servers in a server system on the basis of a manifest file, wherein said configuration module is further configured for: configuring a buffer, preferably a play-out buffer, in said content processing device; and/or, a segment request function in said content processing device on the basis of quality metrics, and/or on the basis of quality of service information determined on the basis of at least part of said stored quality metrics and/or on the basis of one or more configuration parameters, and wherein said quality metrics are associated with one or more paths between said client and one or more streaming servers in said server system and wherein said quality metrics are collected by a monitoring system in said network and stored in a quality database in said network.

In an embodiment said buffer may be configured on the basis of one or more configuration parameters, preferably a minBufferTime parameter, for determining the size of the buffer before play-out of data in said buffer is stated; and/or, wherein said segment request function is configured on the basis of one or more configuration parameters, preferably a segmentStartOffset parameter, for determining the first segment selected from the segments identified in said manifest file that the segment request function will request from said streaming server.

In an aspect, the invention may relate to a monitoring system for monitoring quality metrics associated with a streaming path in a network between a HAS client in a content processing device and a streaming sever, said monitoring system comprising: means for collecting device metrics associated with said content processing device and network metrics associated with at least part of said network from one or more monitoring agents; means for determining quality metrics associated with a streaming path on the basis of on the basis of said device and network metrics; means for determining one or more configuration parameters for a configuration module in said content processing device on the basis of said at least part of said quality metrics, said one or more configuration parameters comprising: at least one buffer size parameter, preferably a minBufferTime parameter, for determining the size of the buffer before play-out of data in said buffer is started; and/or, at least one segment request parameter, preferably a segmentStartOffset parameter, for determining the first segment selected from the segments identified in said manifest file that the segment request function will request from said streaming server.

In an aspect, the invention may relate to a data structure, preferably at least part of a manifest file for use by a client in a content processing device, wherein said client is configured to request and receive segments from at least one server on the basis of said manifest file, said data structure enabling low-latency streaming to said client, said data structure comprising one or more segment identifiers and segment play-out information; and wherein said data structure further comprises:

quality metrics and/or quality of service information comprising one or more QoS levels associated with a streaming path between said client and a streaming server, said quality metrics and/or said quality of service information enabling a configuration module associated with said client to determine one or more configuration parameters for a buffer, preferably a play-out buffer; and/or, for a segment request function in said content processing device; and/or said data structure further comprising one or more configuration parameters associated with a streaming path between said client and a streaming server, said one or more configuration parameters enabling a configuration module associated with said client configure a buffer, preferably a play-out buffer; and/or, a segment request function in said content processing device.

The invention may also relate to a program product, a computer program product comprising software code portions configured for, when run in the memory of a computer, executing the method steps as described above. The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 3 depicts a process for updating a manifest file according to an embodiment of the invention.

FIG. 10 depicts protocol formats for reporting metrics according to an embodiment of the invention.

FIG. 11 depict further protocol formats for reporting metrics according to another embodiment of the invention.

FIG. 12 depicts yet further formats for reporting metrics according to an embodiment of the invention.

FIG. 13 depicts a schematic of a manifest file comprising Quality of Service Information according to a further embodiment of the invention.

DETAILED DESCRIPTION

Figure 1:
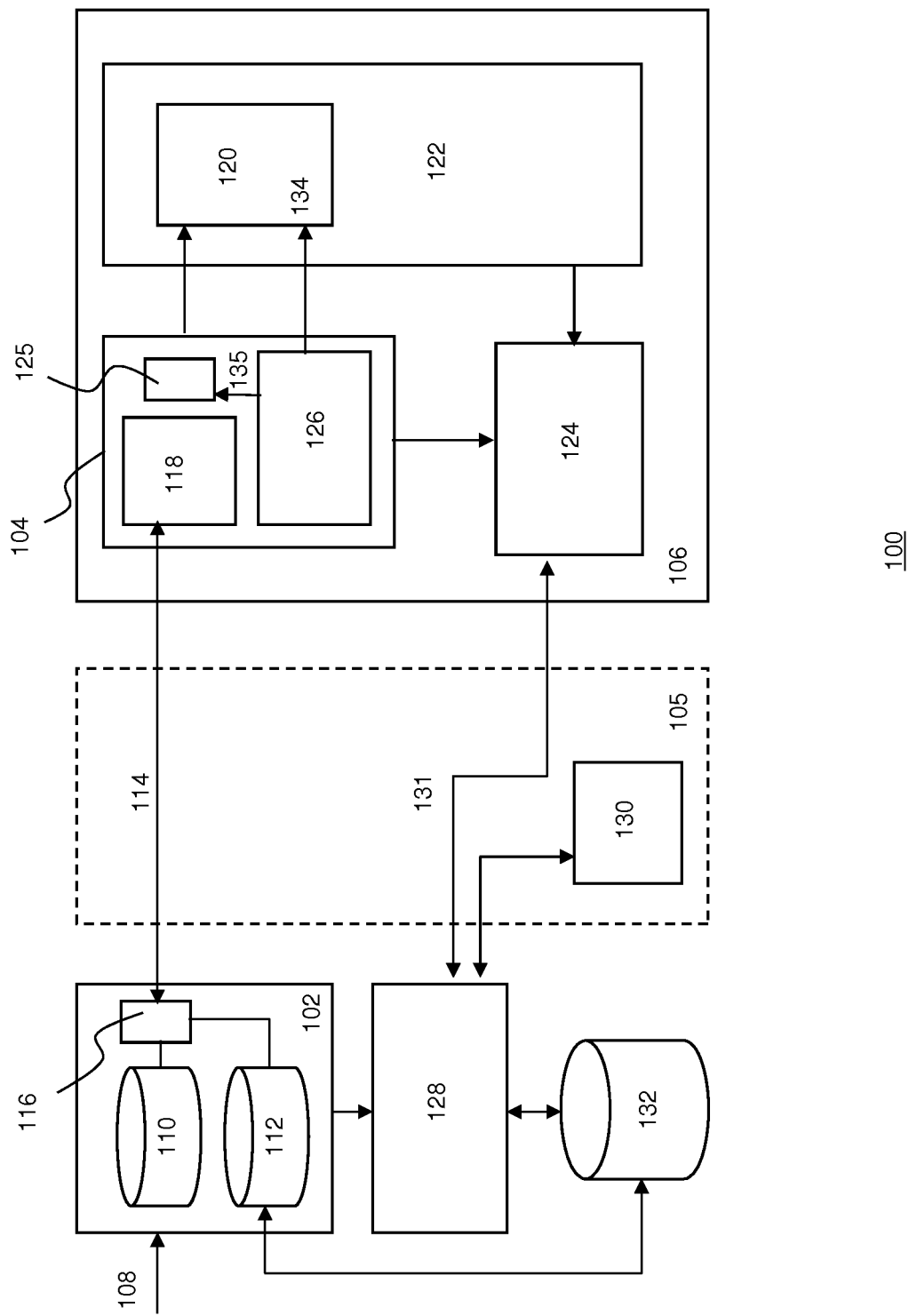
FIG. 1 depicts a schematic of a content delivery system according to one embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system", "node". Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency ("RF"), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

FIG. 1 depicts a schematic of a content delivery system according to one embodiment of the invention. In particular, FIG. 1 depicts a schematic of a content delivery system comprising a server system 102 configured for streaming content to at least one client 104 in a content processing device 106. The server system 102 may comprise one or more streaming servers, which are configured to receive one or more content signals 108, e.g. a (live) video and/or multimedia signal, and to process the content signals in order to generate segmented content streams.

As will be described hereunder in more detail, generation of a segmented content stream may include dividing the content signal in separated segments of a predetermined size, wherein each segment may be encoded in multiple different representations. Here, a representation may relate to different variants of the content signal, including: 2D and 3D formats, different video and/or audio qualities (e.g. SD/HD, bitrates, etc.), different spatial resolutions, etc.

During the generation of the segmented content stream, one or more manifest files (also known as a Media Presentation Description or MPD for MPEG-DASH or M3U8 playlist for Apple HTTP Live Streaming) may be generated. Here, the term "manifest file" may generally refer to a special data structure, which may comprise segment identifiers (descriptors) identifying the segments forming a content item, e.g. a video title. It may further comprise location information of a (set of) network node(s), e.g. (media) streaming server(s), which may be configured to either, deliver the segments to the client or to provide the client with information where the segments may be retrieved. A manifest file may further comprise segment play-out information for determining the (temporal) relation between the segments and media metadata comprising information regarding media characteristics such as video resolution, bit rates, etc.

The manifest file and the segments associated with the different representations may be stored at predetermined locations in the server system, e.g. a segment storage node 110 and a manifest storage node 112. In an embodiment, the location of the manifest file may be stored as an URL or an URI. When requesting a particular content item, the server system may provide the client with the URL or the URI of the manifest file.

When a user would like to join a (live) streaming event or start a streaming service, he may select an event or service from a web page. After selection, an (HTTP) streaming function 116 in the server system may send a manifest file associated with the streaming event or service via a network connection 114 to the client. In an embodiment, the streaming function may be implemented on an HTTP server in the server system.

The client may be configured to parse the manifest file and to use the information in the manifest file to request a segmented stream from a streaming server of the server stream and to receive segments, which are sent over the network to the client. During streaming the packets associated with the segment may follow one or more paths in the network. Such path may hereafter be referred to as a streaming path. The streaming path between the client and the streaming server may be established on the basis of the HTTP/TCP protocol.

To that end, the server system may comprise an HTTP server, which is configured to send segments to the client on the basis of an HTTP adaptive streaming (HAS) protocol. In such scheme, the client (a HAS client) may send an HTTP request for a segment to the HTTP server, which —in response—sends one or more segments of a particular representation in an HTTP response message to the client. During the streaming of segments to the client, segments are buffered in the receiving buffer 118 of the client. The encoded encapsulated segment data (frames) in a segment may be unpacked, decoded and arranged in a play-out buffer 120. The data in the play-out buffer may be arranged according to a presentation timeline of the content stream. The media engine 122 may subsequently display the data in the play-out buffer to the user.

Examples of adaptive streaming protocols include Apple HTTP Live Streaming [http://tools.ietf.org/html/ draft-pantos-http-live-streaming-07], Microsoft Smooth Streaming [http://www.iis.net/download/ SmoothStreaming], Adobe HTTP Dynamic Streaming [http://www.adobe.com/products/ httpdynamicstreaming], 3GPP-DASH [TS 26.247 Transparent end-to-end Packet-switched Streaming Service (PSS); Progressive Download and Dynamic Adaptive Streaming over HTTP] and MPEG Dynamic Adaptive Streaming over HTTP [MPEG DASH ISO/IEC 23001-6]. HTTP allows an efficient, firewall-friendly and scalable scheme for delivering segments to clients.

The content processing device may generally relate to a (mobile) content play-out device such as an electronic tablet, a smart-phone, a notebook, a media player, a home gateway or DASH enabled devices such as a DASH-enabled HbbTV display device. Alternatively, the content processing device may be a set-top box or content storage device configured for processing and temporarily storing content for future consumption by a content play-out device, which has access to the stored content.

Similarly, the server system may comprise one or more streaming servers, including one or more HTTP streaming servers. Alternatively, the server system may comprise (or be part of) one or more content delivery networks (CDN). A CDN (not shown) may comprise one or more edge nodes (also referred to as delivery nodes or surrogate nodes) and at least one central CDN node. The central CDN node may comprise a content origin function (COF) for controlling ingestion of content into the CDN from an external source (e.g. a content provider or another CDN) and a CDN control function (CDNCF) for controlling the distribution of one or more copies of the segments to the delivery nodes and for redirecting clients to appropriate delivery nodes (a process also known as request routing). A content location database may be used to store information about where (e.g. which delivery nodes and which folders in a delivery node) segments are stored within a CDN.

In one embodiment, the CDN may comprise a content processing function configured for processing a (live) media stream after it is ingested by the CDN. The content processing function may comprise an encoder for generating (real-time) different versions (representations) of a content signal. Thereafter, the content signals may be partitioned into segments of a predetermined size, wherein each segment may be associated with a particular representation. For example, one representation of the content signal may comprise segments of a predetermined quality (e.g. high, average and low bitrate). These segments may be encapsulated according to a suitable transport protocol format, e.g. an MPEG-based scheme. In an embodiment, segments may be encrypted and/or scrambled before they are partitioned in segments. Segments associated with a live stream may be temporarily stored (buffered) at the one or more delivery nodes servers of the CDN before the content consumption devices may access them.

In response to varying network conditions, (e.g. varying delays experienced by data (segments) that are sent over the streaming path to the client), the streaming protocol may allow dynamic adaptation of the representation during streaming of the segments to a client (e.g. switching from a high quality representation to a low quality representation or vice versa) in accordance with an adaptation algorithm which may use the buffer status as an adaptation parameter. If the play-out buffer approaches an underrun status, the client may change (adapt) the representation from a first representation to a second (low(er) quality) representation.

In that case, a segment request function 125 in the client may select from the manifest file segments associated with the requested representation and continue the streaming process on the basis of these segments. This way, the client may adapt the streaming process in response to changing network conditions (as reflected in the buffer status), which may be substantial when content is streamed over an unmanaged network such as the Internet.

In conventional HAS client configurations, the size of the play-out buffer is preconfigured and is usually relatively large (e.g. around the size of three of more segments). In order to cope with unexpected jitter and congestion, and in order to reduce the chances of a buffer underrun occurring, the buffering performed at the client is substantial compared to the total end-to-end delay between the source and the play-out of the content processing device. Conventional HAS client are thus configured to deal with fluctuating circumstances that may occur in a non-managed network such as the internet.

The end-to-end delays may include: delays associated with creation and encoding of segments; delays associated with the distribution of the segments to a content delivery network (CDN) and associated with the internal distribution of the segments within the CDN to its edge nodes; delays associated with requesting segments from the CDN and delivering segments to the client (via the network and the home network); and, delays associated with the processing of segments at the content processing device. These delays may for example include delays due to buffering and decoding processes.

In order to reduce the risk that not sufficient segments are available to fill the buffer, a conventional client is further configured such that the first segment that is going to be requested by the client (upon joining the streaming event) will be a segment that is made available earlier by the streaming source (typically three segments earlier) than the segment that has been made available by the streaming source upon joining the streaming event.

Hence, when starting streaming, it will request segments "back-in-time" and the play-out buffer will be filled with segments up to the configured size, before it starts decoding and play-out of the data in the play-out buffer. Due to the buffer and segment request function configuration, a substantial latency (delay) exists between the play-out of a live streaming event by a HAS client and the play-out of the live stream by other content processing devices that are based on other transport mechanisms such as conventional broadcast or multicast streaming, even in case a large play-out buffer is not necessary. These delays cannot be solved by known IDMS techniques.

For example, in some cases, streaming events and streaming services may be delivered (or at least partly delivered) over a managed network, e.g. an IP network of a network operator, which is managed in accordance with a predetermined Quality of Services (QoS). Fluctuations in the delays in such networks may be much smaller and much more predictable and stable when compared to the network delays of an unmanaged network.

In order to cope with these undesirable effects, in one embodiment the content processing module may comprise a configuration module 126, which is configured to adapt the size of the play-out buffer on the basis of quality metrics associated with the streaming path 114 between the server system and the content processing device. In a further embodiment, the configuration module may configure the segment request function 125 in the client on the basis of the quality metrics thereby enabling the segment request function to determine which segment should be requested first by the client when the client joins a (live) streaming event.

The quality metrics of the streaming path may be determined by a monitoring system 128, which may receive quality metrics from one or more monitoring agents 124, 130. In an embodiment, the monitoring system may receive device quality metrics from a monitoring agent 124 in the content processing device. The device monitoring agent 124 may be configured to collect device quality metrics (i.e. measured parameters associated with the segment retrieval and play-out process executed on the content processing device such as segment reception times, buffer overload and underruns of the receiving buffer and/or play-out buffer, segment play-out times, etc.). The device monitoring agent may retrieve these parameters from the client 104, the receiving buffer 118, the play-out buffer 120 and the media engine 122 and send these device quality metrics to a monitoring system 128 associated with the server system. The process for collecting and processing the quality metrics is described hereunder in more detail with reference to FIG. 2.

In another embodiment, the monitoring system may receive network quality metrics from one or more network monitoring agents 130 in the network. A network monitoring agent may be configured to measure and collect real-time Quality-of-Services (QoS) and/or Quality-of-Experience (QoE) metrics of the network (network quality metrics) from the network and to correlate at least part of the network quality metrics with the one or more streaming paths between a client and one or more streaming servers of the server system.

A monitoring agent may collect metrics on an end-to-end basis, i.e. up to and including metrics associated with the home network and the type of device connected to the home network thereby also taking into account sources packet loss in the home network, fluctuations in load of het home-network, terminal capabilities, available bandwidth within a home-network. A monitoring agent may collect quality metrics on the basis IP addresses and/or network identifiers so that it is capable of distinguish different devices, which are connected to the server system via different access networks, e.g. a WLAN or a Wi-Fi network. In one embodiment, the monitoring agents may communicate with the monitoring system over an HTTP-based communication channel 131.

During streaming of content to the client, the monitoring system may collect quality metrics associated with a streaming path between the client and the server system and store the quality metrics in a quality database 132. In an embodiment, the quality metrics may be stored in a QoS client profile. When sufficient data are collected, the QoS client profile in the quality database may comprise sufficiently reliable quality metrics that may be used to configure the play-out buffer and/or the segment request function in order to determine which segment should be requested first by the client when the HAS client joins a (live) streaming event.

When a client requests the server system to join a streaming event, e.g. upon requesting or receiving a manifest associated with the streaming event, it may access the QoS client profile of the requesting client, retrieve quality metrics and process it such that it can be used by the configuration module 126. Various ways of processing and instructing the configuration module are described hereunder in more detail.

In an embodiment, at least part of the quality metrics are sent to the configuration module in the content processing device which may determine one or more configuration parameters 134,135 for determining the size of the buffer before play-out of data in said buffer is started and/or for determining the first segment from the segments identified in the manifest file that the segment request function will request from the streaming server. Alternatively, the monitoring system may determine said one or more configuration parameters and send the parameters to the configuration module.

Alternatively and/or in addition, in another embodiment, the monitor system may determine QoS information and/or one or more configuration parameters on the basis of the quality metrics and store this information in the QoS client.

The QoS information may define one or more QoS levels, wherein a QoS level may be associated with one or more predetermined configuration parameters for said configuration module.

For example, the one or more QoS levels may comprise at least at least a QoS (low latency) level defining one or more (preconfigured) configuration parameters for configuring the client in a low-latency mode (i.e. small buffer size, small segment offset start) and a QoS (high latency) level defining one or more (preconfigured) configuration parameters for configuring the client in a high-latency mode (i.e. large buffer size, large segment offset start). A high latency mode or level may sometimes also referred to as 'regular' latency level or mode, in which case it may then relate to the default level or mode, common for use (e.g. 'regular') when retrieving segmented content over an unmanaged network such as the internet. Hence, the quality of service information may be associated with different sets of configuration parameters that may be preconfigured in the monitoring system or in the client. This way, a certain (low, medium, high) latency mode of the HAS client may be selected by sending a message comprising QoS information associated with the expected QoS level (low, medium, high) to the configuration module. On the basis of QoS information the configuration module may selected a preconfigured set of configuration parameters and use these to configure the client.

This way play-out delays due to an excessively large (over-dimensioned) play-out buffer may be reduced. In some embodiments, the server system may process the QoS information before it is sent to the configuration module. More detailed examples of the QoS information and the processing of the QoS information are described hereunder.

During streaming, the monitoring system may collect quality metrics of the streaming path and update the QoS client profile in the quality database. The metrics may be collected continuously, periodically or at predetermined points in time.

If the QoS level of the streaming path is decreased or increased by a predetermined value, the client may be reconfigured by the configuration module on the basis of new quality metrics. To that end, in one embodiment, the client may be configured to regularly (periodically) send an update request for quality metrics to the server system or to the monitoring system. In one embodiment, the update request may relate to a request for a manifest file, wherein the manifest file may comprise current quality metrics, QoS information and/or configuration parameters associated with the streaming path.

In another embodiment, the monitoring system may monitor changes in the QoS level of streaming paths. If such change is detected, the monitoring system may trigger an update of the quality metrics and send the quality metrics, QoS information and/or configuration parameters associated with the streaming path to the content processing device over a separate communication channel (e.g. an HTTP-based communication channel). In one embodiment, the communication channel may relate to a (bi-directional) HAS control channel which is associated with the streaming path. Details on the HAS control channel are described hereunder in more detail with reference to FIG. 9. This way, the buffer and/or segment requesting function may be dynamically adjusted in response to changing network conditions (and associated changes in the QoS level).

In order for the configuration module to configure the play-out buffer, in one embodiment, the QoS information may be sent to the client in a manifest file. In that case, preferably the configuration module may be part of the HAS client. When a client requests the server system to join a (live) streaming event, a streaming path may be established and in response to the request, a manifest file comprising QoS information associated with the streaming path may be sent to the client. In another embodiment, the QoS information may be sent separately from manifest file to the client over an HTTP/TCP connection.

Figure 2:
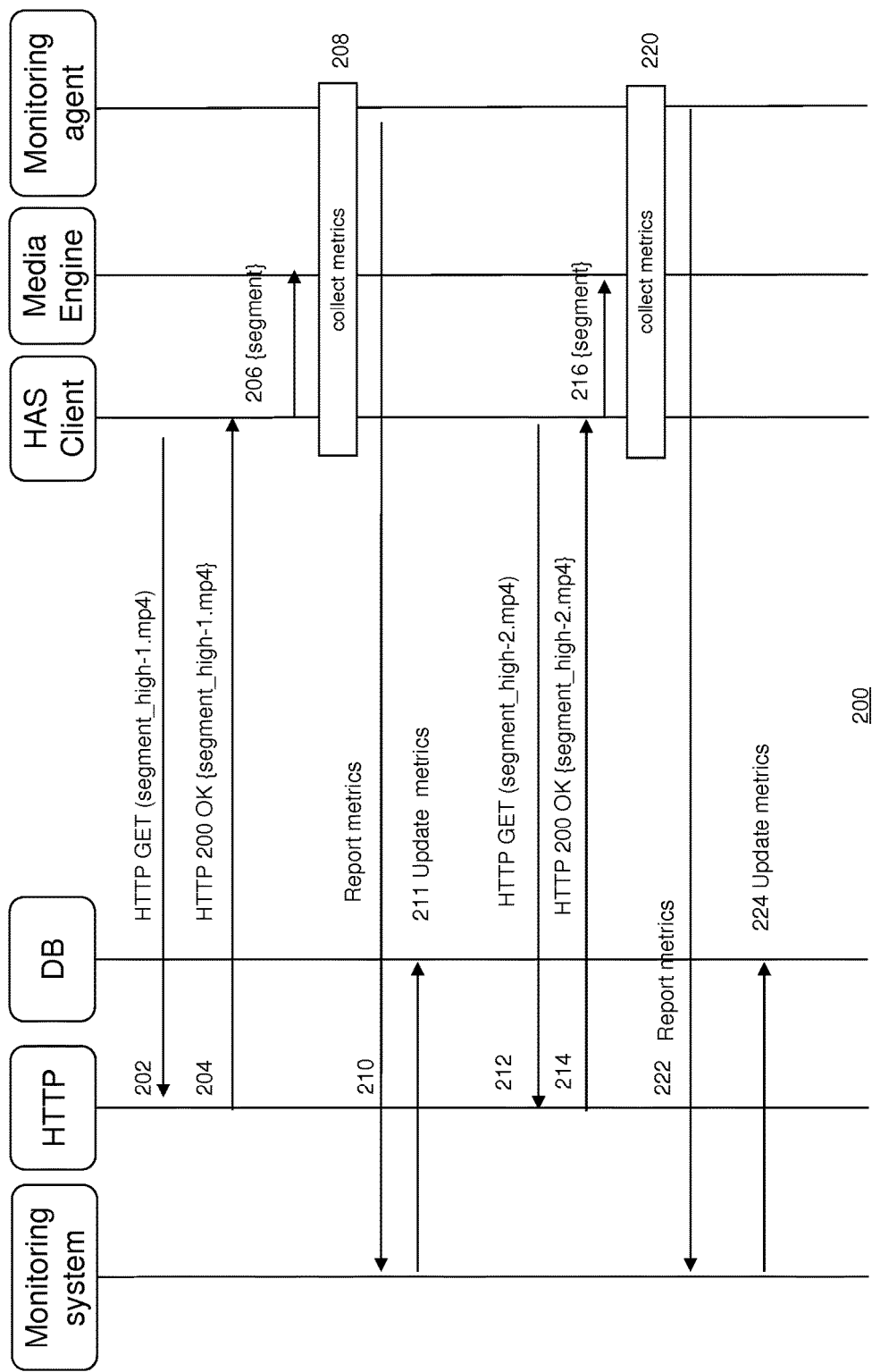
FIG. 2 depicts a schematic of a manifest file according to one embodiment of the invention.

FIG. 2 depicts a process for collecting metrics according to an embodiment of the invention. In particular, FIG. 2 depicts a least part of a process of streaming segments to a HAS client wherein the client uses a manifest file for retrieving segments from the server system and wherein one or more monitoring agents may collect quality metrics associated with the streaming path between the HAS client and the streaming server. The streaming process may include the HAS client sending an (HTTP) request for a predetermined segment (in this case segment_high-1.mp4) to the server system (step 202) and the server system may respond to the request by sending an (HTTP) response comprising (part of) the requested segment to the client (step 204), which may process the received data and send the data to a play-out buffer associated with the media player (step 206) before they are decoded and presented to the user.

During this process, the monitoring agent in the content processing device may collect device quality metrics from the HAS client, the play-out buffer and the media agent (step 208) and send this information in a QoS report to the monitoring server (step 210), which may use the report to update the QoS client profile in the quality database (step 211). This process may be repeated (see e.g. steps 212-224) throughout the streaming process so that the monitoring server may collect and build a QoS client profile of the streaming path comprising (historical) quality metrics that can be used for determining the settings of the buffer and the segment requesting function in the content processing device. In one embodiment, the monitoring agent may collect device quality metrics on a number of requested segments before it sends the device metrics to the monitoring system.

The monitoring agent may collect and measure different types of metrics, wherein the metrics may also include metadata that may be used by the monitoring system to classify the metrics with respect device type, data type, protocol/codec type, network type, access technology type, etc. into the quality database. In an embodiment, the quality metrics may include metrics associated with the adaptive streaming process, e.g.: manifest file number, content profiles, content title, content description, specified play-out duration, initial profile, originating server manifest, originating server segment, number of redirects, bitrate up changes, bitrate down changes, number of buffered segments, segments received, segments requested, buffer underrun, segment received bytes, segment profile bitrate, segment read bitrate, segment nr read bitrate below profile, number of segment timeouts, number of segment failures, number of segments in the receiving buffer and/or play-out buffer.

In another embodiment, the quality metrics may include information associated with the access technology, e.g. type of access technology (Cable, DSL, fiber, etc.), type of access line (VDSL, ADSL, etc.), typical delays and/or bandwidths associated with these access lines.

In a further embodiment, the quality metrics may include information associated with the content processing device, e.g. serial number, manufacturer of the content processing device and/or a chipset identifier. In another embodiment, the metrics may include information associated the utilization of the hardware in the content processing devices, e.g. free available memory, CPU utilization and/or signal strength. In yet another embodiment, the metrics may include identifiers for identifying an access network and/or platform.

In an embodiment, the quality metrics may include information associated with the network, including throughput associated with load due to the number of users sharing the same network resources, dropped packets, bit errors, latency due to queues or congestions, jitter and out-of-order delays due to the fact that different packets may arrive in different order at the destination.

In yet another embodiment, a monitoring agent may monitor and collect device quality metrics associated with the streaming process (at least partly) in accordance to the DASH (Quality) Metrics as defined in MPEG DASH ISO/IEC 23001-6. The Annex D in this document entitled "DASH Metrics" specifies the various DASH (Quality) metrics: TCP connections, HTTP request/response transactions, Representation switch events, Buffer level and Play list.

For example, in one embodiment, at the input of the HAS client, the monitoring agent may monitor sets of TCP connections (IP address, initiation, connect and closing times), one or more transmitted HTTP requests for a segment (each being defined by transmission time, contents and TCP connection) and one or more received HTTP responses comprising requested segments (each being defined by reception time of the response message, contents of the response header and the reception time of each byte of the response body).

In another embodiment, the monitoring agent may monitor one or more encoded (MPEG) frames at the output of the HAS client (wherein an encoded frame may be defined by media type, identifier, decoding time, presentations time and/or delivery time). Similarly, at media engine, the monitoring agent may monitor one or more decoded (MPEG) frames (each being defined by a media type, the presentation timestamp of a frame and the actual presentation time of a decoded frame (or a part thereof).

Once the metrics are collected by the monitoring agent, a reporting process takes place wherein the monitoring agent transmits the collected metrics to the server.

In embodiments of the invention, these collected metrics are inserted within the URI of a HTTP GET or HTTP POST request as parameters. The HTTP GET or HTTP POST requests may be used to report the collected metrics. FIG. 10 provides examples of such requests 1001, 1002, concerning buffer level metrics.

In alternative embodiments according to the invention, the metrics may be reported by the monitoring agent in a HTTP POST or HTTP PUT request. FIG. 11 provides examples of such requests 1103, 1104, concerning buffer level metrics.

In one embodiment the JSON format is utilized to describe the metrics, In a further embodiment the metrics are written according to the XML format. FIG. 12 provides exemplary formats of such requests 1205, 1206, containing buffer level metrics.

In the exemplary requests of FIG. 11, the URI in the first line of the request represents the name of the file to be created on the server. Hence, the appropriate extension either .xml or .json is provided, in accordance with for example the formats detailed in FIG. 12.

In another embodiment the collected metrics are reported back via WebSocket. Once the connection via WebSocket has been established between the monitoring agent and the server, the collected metrics are transmitted by the monitoring agent to the server.

In another embodiment the collected metrics are written to a file by the monitoring agent and then sent to the sever. The transport of the file may for example be achieved by FTP, FTPS, Peer-to-Peer (e.g. Bittorent), SFTP, SCP. The files may be written in for example XML or JSON formats as shown in FIG. 12. In case WebSocket is used, the file may be encoded in base 64 and inserted in the body of HTTP messages, which may be sent over a WebSocket connection by the monitoring agent to the server (system).

FIG. 3 depicts a schematic of at least part of a manifest file according to one embodiment of the invention. In particular, FIG. 3 depicts at least part of a manifest file (in this example part of an MPEG DASH MPD) comprising QoS information and configuration parameters, which may be used by a configuration module in the content processing device for configuring the play-out buffer and the segment requesting function.

In this particular embodiment, the manifest file may comprise QoS information comprising a first QoS level (e.g. "high-latency" or "regular" mode) 310 and a second QoS level ("low-latency" mode) 312. The first QoS level may define a regular mode 310 comprising configuration parameters associated with the conventional settings of a HAS client which are suitable when streaming over an unmanaged network. The second QoS level may define a low-latency mode 312 comprising configuration parameters associated with low-latency settings of a HAS client which are suitable when streaming over a managed network.

The manifest file comprising the QoS information and the associated configuration parameters may be sent in the manifest file to the HAS client which may parse the manifest file and send the QoS information and the configuration parameters to the configuration module, which stores the information and parameters.

Based on the current quality metrics of the streaming path, the monitoring system or the configuration module may for example select the regular or the low-latency mode.

It is submitted that many variants of the use of quality metrics, the QoS information and/or configuration parameters are possible without departing from the invention. For example, in one embodiment, the manifest file may only comprise configuration parameters associated with the current quality metrics, which are used by the configuration module to configure the buffer and/or segment requesting function. In another embodiment, the manifest file may only comprises QoS information for signaling an (expected) QoS level (e.g. a regular mode or low-latency mode) without any configuration parameters. The QoS level may be used by the configuration module to select a pre-configured set of configuration parameters which are locally stored in the memory of the content processing device. In yet another embodiment, the manifest file may comprise quality metrics associated with the streaming path.

The quality metrics may be used by the configuration module to either determine a QoS level and to select preconfigured configuration parameters on the basis of the QoS level or to directly determine one or more configuration parameters on the basis of the quality metrics. In embodiments of the invention such quality metrics may be one or more parameters related to the Quality of Service, also referred to a QoS parameters. Such QoS parameters may for instance relate to, but are not limited to: guaranteed bandwidth, packet loss rate, delay, jitter. FIG. 13 provides an exemplary MPD comprising quality metrics in the form of QoS parameters. Examples of these QoS parameters in the MPD are: MinGuaranteedBandwidth: minimum bandwidth that the client may expect (in the example in bits/s); MaxGuaranteedBandwidth: maximum bandwidth that the client may expect (in the example in bits/s); PacketLossRateInPercent: percentage of packet loss based on traffic history; Delay: latency between the client and the content retrieval node (e.g. the streaming server/cache). In this example provided milliseconds; Jitter: jitter between the client and the content retrieval node (e.g. the streaming server/cache). In this example provided milliseconds.

In one embodiment, the configuration parameters may comprise an MPD parameter or a combination of MDP parameters as defined in ISO standard ISO/IEC 23001-6 in order to achieve the desired play-out buffer configuration. For example, a min buffer size parameter "minBufferTime" 314,318 may be used as a configuration parameter for setting the minimum size of the buffer before play-out of data in the buffer is started (e.g. a size of 5 second in the regular mode and a size of 1 second in the low-latency mode).

In another embodiment, the configuration parameters may comprise a suggested presentation delay parameter "suggestedPresentationDelay" 316,320. This parameter may be used for configuring the HAS client to introduce a play-out delay on top of the play-out time of a predetermined segment as indicated in the manifest file. For example, if the information in the manifest file determines that a segment needs to be played-out at 12:10 and the parameter suggestedPresentationDelay is set on 00:10, the segment will be played-out 10 seconds later, i.e. 12:20.

In yet a further embodiment, the configuration parameters may comprise a segment start parameter "segmentStartOffset" 324,326 for determining the first segment from the segments identified in the manifest file that the segment request function will request from the streaming server.

This parameter may define an offset with respect to the current segment that is made available by the content source when a client joins a live streaming event. For example, a streaming server in the server system may have created a current segment 1000. However, if the client starts play-out on the basis of current segment 1000, it is not possible to build a buffer of sufficient size as segment 1001 is not yet available. This may cause a problem in a network with a low or moderate QoS level as in that case it cannot be guaranteed that the client will receive segment 1001 in time.

In order to cope with that problem, the "segmentStartOffset" parameter may be set. When setting this parameter to one, two or three respectively, the segment request function will determine that play-out will be started on the basis of segment 999, 998 or 997, i.e. segments which were generated earlier than the current segment 1000 that was available at the source when the user joined the live streaming event. For example in FIG. 3 the regular mode is associated with a first segment that lags three segments behind the segment that is made available by the streaming server at the moment when the HAS client joins the streaming session and the low-latency mode is associated with a first segment that lags one segment behind the segment that is made available by the streaming source when the HAS client joins the streaming event. When the quality metrics indicate that the streaming path is associated with a low QoS (unmanaged) network, the regular mode may be selected in order to reduce the risk that no sufficient data (segments) can be buffered by the play-out buffer. When the quality metrics indicate that the streaming path is associated with a high QoS (managed) network, the low-latency mode may be selected in order to reduce the latency in the streaming as much as possible.

Instead of providing the quality metrics, the QoS information and/or configuration parameters in a manifest file to the client, at least part of this information may be provided to the client via a separate communication channel instead of part of the manifest file. This embodiment will be described hereafter in more detail with reference to FIG. 6-8.

The manifest file may comprise further information. For example, the manifest file may comprises a manifest type indicator 302 for indicating whether the manifest file is a static manifest file, which does not change in time, or a dynamic manifest file, which may change in time. For example, in an embodiment, the client may receive at predetermined times, e.g. periodically, a new updated manifest file or an manifest file update for updating the manifest file in the client, comprising newly updated information associated with the streaming path. This way, the HAS client may be reconfigured in response to changes in the QoS level in the streaming path.

The manifest file may further comprise a segment presentation duration parameters "mediaPresentationDuration" 304, i.e. the length of the content stream (in seconds), segment location information 322, e.g. one or more URLs indicating where the content may be retrieved, and media metadata, e.g. a profile parameter 308 indicating the type of HAS file, e.g. an MPEG-DASH and/or the type of service, e.g. a 2011 version of a VoD service.

Figure 4:
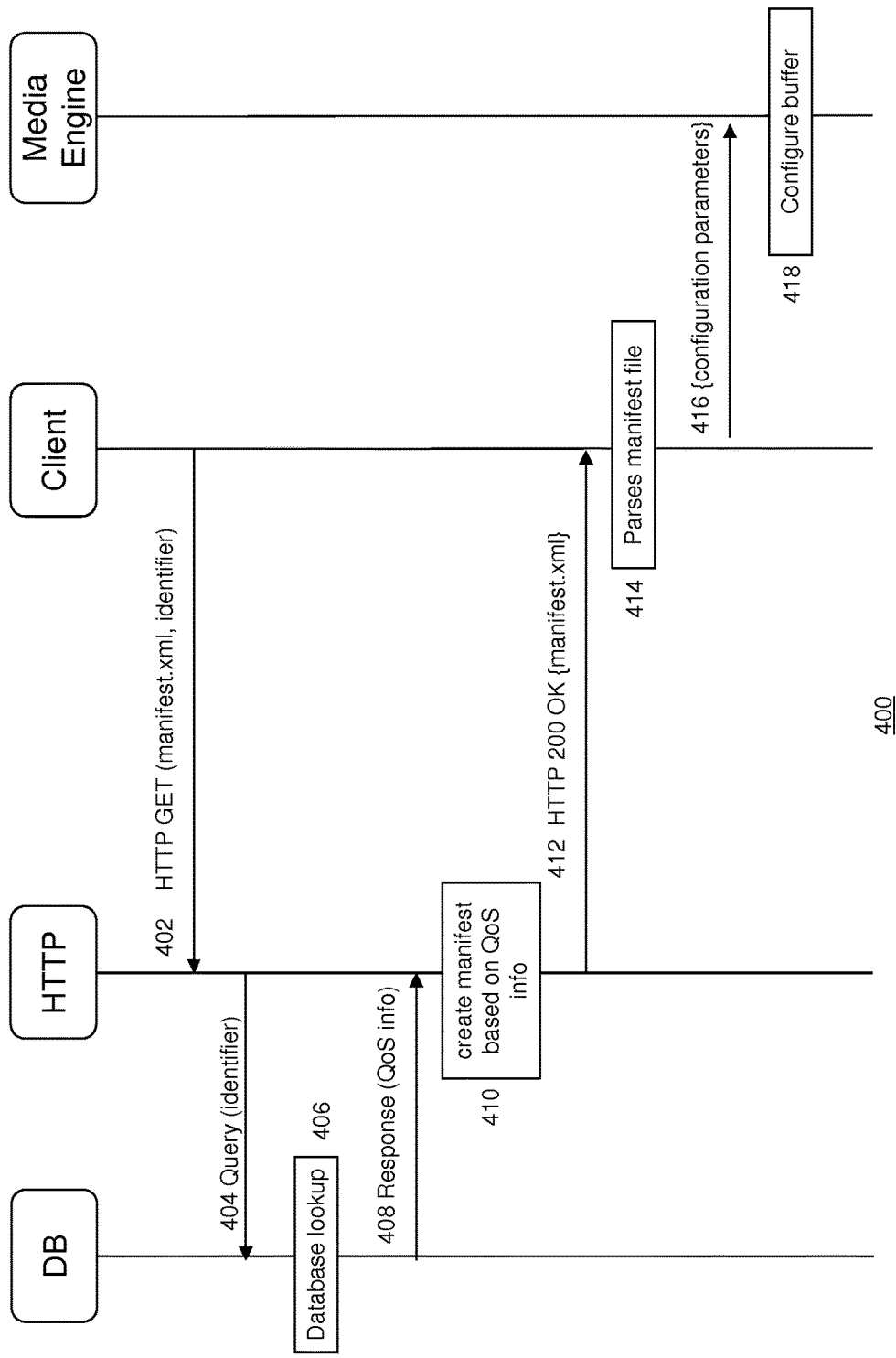
FIG. 4 depicts a process for delivering segments to a client according to one embodiment of the invention.

FIG. 4 depicts a process for updating a manifest file according to an embodiment of the invention. The process may start with a customer paying for joining a live streaming event via a website of a content provider. After obtaining an access right, the customer—at some point in time—may instruct the client via a user interface to join the live streaming event (e.g. by pressing a play button). In that case, the client may requests a manifest file from the server system. For example, it may send a request message for a manifest file associated with the streaming event, e.g. an HTTP GET message, to the server system (step 402). In that case, the request message may use for example the name of the manifest file and a client identifier (e.g. an IP address and/or a device identifier and/or any other information from the HTTP, TCP or IP headers) for identifying the client requesting the streaming service.

After having received the request message, the server system may query the quality database on the basis of the client identifier for QoS information associated with the streaming path (step 404). The database may look for the QoS client profile (step 406) and—if a profile is found—may determine QoS information on the basis of quality metrics and send the information to the sever system (step 408). The server system may then retrieve a manifest file associated with the (live) streaming event from the manifest storage and modify it by insert the QoS information into the manifest file. This way a client-specific manifest file is created that comprises QoS information that is specific for the client and that provides optimal configuration of the content processing device (step 410).

As already described in detail with reference to FIG. 1-3, various types of information (quality metrics, QoS information and/ configuration parameters) may be sent to the content processing device in order to configure it on the basis of quality metrics associated with the streaming path. Hence, although the embodiments described with reference to FIG. 4-9 are described on the basis of the use of QoS information, it is submitted that these examples also encompass the use of quality metrics, QoS information and/ configuration parameters.

The manifest file comprising the QoS information may be sent to the client (step 412). In one embodiment, the manifest file may be sent in an HTTP response message to the client, which may parse the information in the manifest file (step 414) and forward the QoS information to the configuration module (step 416) (which may be part of the client). In addition, but not necessarily, the manifest file may comprise configuration parameters, which may (for instance in case the configuration module doesn't already have these) also be forwarded to the configuration module. The configuration module may use the QoS information in order to configure the play-out buffer (step 418). Hence, streaming path and/or content and/or client -specific QoS information in the manifest file may be used to set the play-out buffer to a size such that the start-up delays is minimized.

This way, a HAS client that joins a (live) streaming event can be easier synchronized with the other content processing devices in the streaming event.

Figure 5:
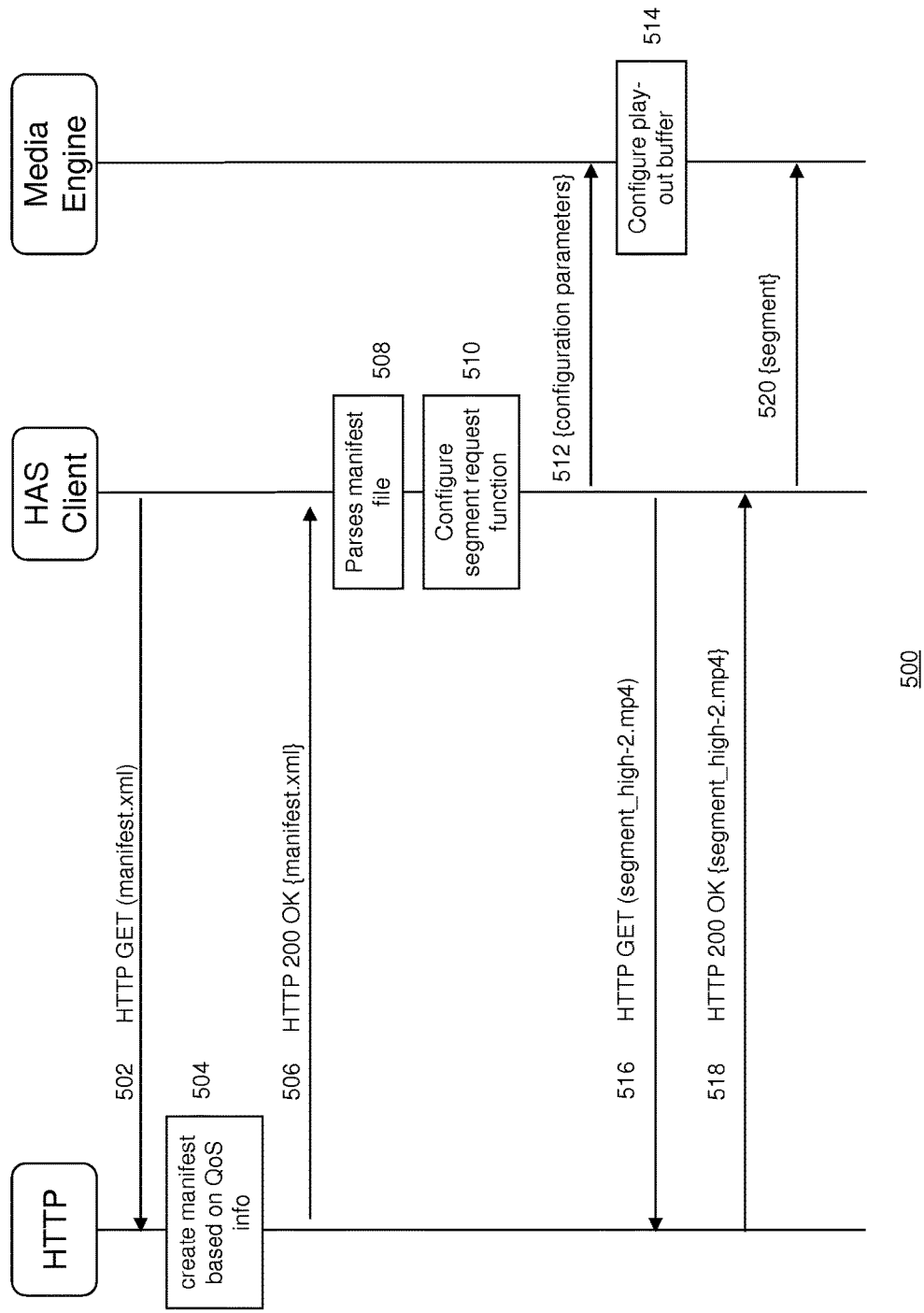
FIG. 5 depicts a schematic of a content delivery system according to another embodiment of the invention.

FIG. 5 depicts a protocol flow for enabling low-latency streaming of segments to a client according to one embodiment of the invention. The process may start in a similar way as described with reference to FIG. 4: if a client is instructed to join a live streaming event, it may request a manifest file from the server system (step 502). When receiving the request, the server system may create a client-specific manifest file comprising QoS information associated with the streaming path (step 504). The manifest file may be created according to the process as described with reference to FIG. 4.

The client-specific manifest file comprising the QoS information may be sent to the client (step 506), which may parse the information in the manifest file (step 508) (e.g. the QoS information, the segment identifiers, the segment location information and the segment play-out information).

On the basis of the QoS information, the configuration module (which may be part of the client) may configure the content processing device in order to minimize the play-out delay. To that end, the configuration module may configure the segment request function in the client (step 510) on the basis of the QoS information which may be associated with a predetermined segmentStartOffset parameter. This way, the segment request function may determine the first segment that should be requested when starting streaming. Alternatively and/or in addition, the configuration module may use the QoS information which may be associated with a predetermined minBufferTime parameter (configuration parameter), to configure the size of the play-out buffer. This parameter may be sent to the buffer (step 512) so that it can be configured accordingly (step 514).

Meanwhile, the client may start the process of requesting segments from the server system. In particular, after the client has identified the first segment (e.g. segment_high-2.mp4 that needs to be retrieved location information, e.g. an URL, associated with the first segment may be retrieved and an HTTP request message, e.g. an HTTP GET message, may be sent to that location (e.g. the network address of an HTTP server) (step 516). The HTTP server may respond to the request by sending an HTTP response message comprising the requested segment to the client (step 518), which may unpack and decode the segment data and transfer the decoded data to the play-buffer associated with the media engine (step 520).

Figure 6:
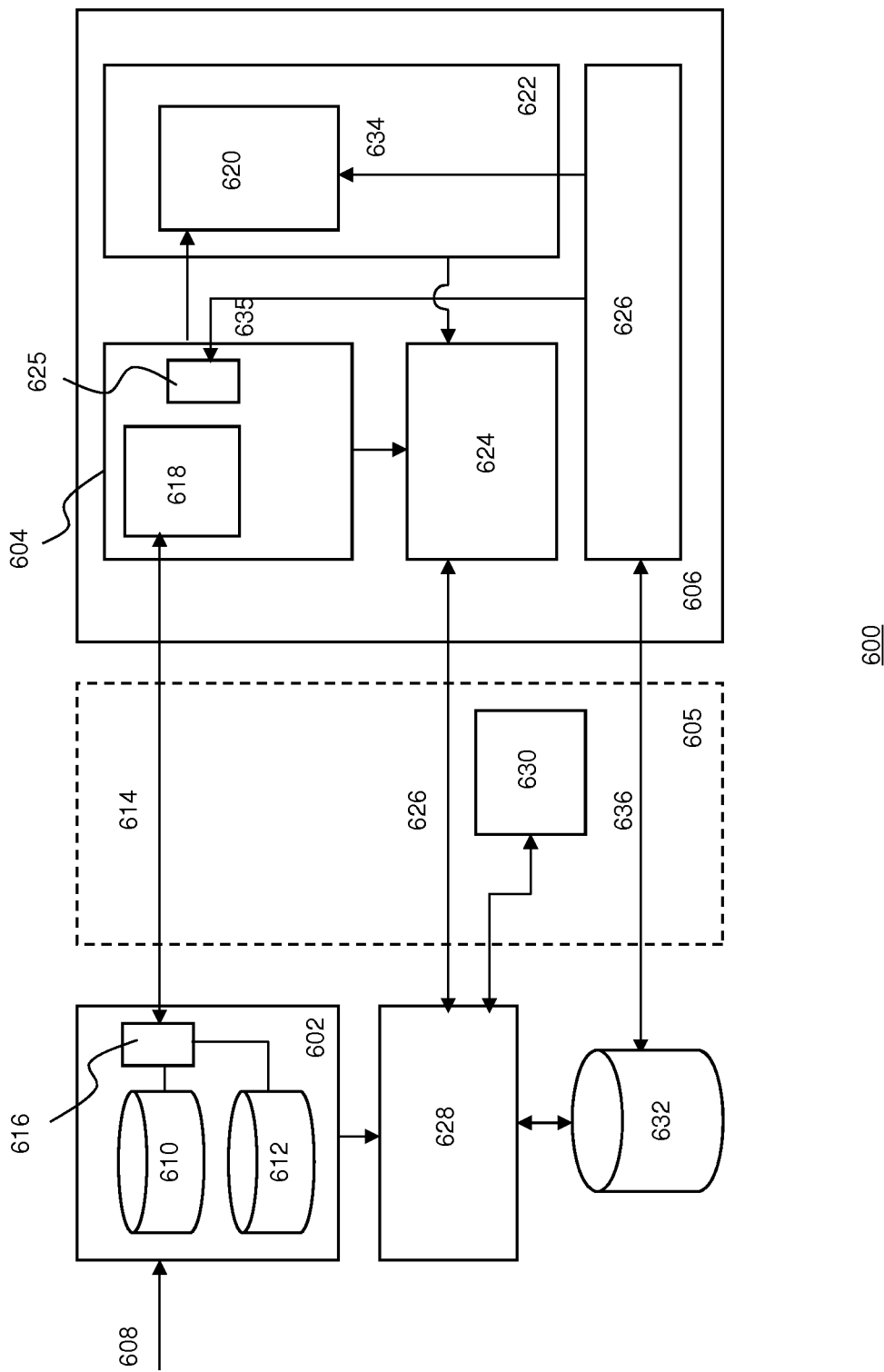
FIG. 6 depicts a schematic of a manifest file according to a further embodiment of the invention.

FIG. 6 depicts a schematic of a content delivery system according to another embodiment of the invention. The delivery system may comprise similar components as the content delivery system described with reference to FIG. 1, i.e.: a server system 602 configured for streaming content to at least one (HAS) client 604 in a content processing device 606. The server system may be configured to receive one or more content signals 608, e.g. a (live) video and/or multimedia signal, and to process the content signals in order to generate segmented content streams and associated manifest files, which may be stored in a segment storage 610 and manifest storage 612 respectively.

When a (live) streaming event is joined, an (HTTP) streaming function in the server system may send a manifest file associated with the streaming event to the client over a (HTTP) network connection 614. The manifest file may be used by the client to request segments from the HTTP streaming function which will send segments over the (HTTP) network connection (the streaming path) to the client, wherein the HTTP streaming function is configured to delivery segments to the client on the basis of a HAS protocol. During the streaming, segments are buffered in the receiving buffer 618 of the client, which may unpack the encapsulated segments (frames) and arrange unpacked (MPEG encoded) data in a play-out buffer 620 for decoding and play-out by a media engine 622.

In response to varying network conditions, (e.g. delays experienced by data (segments) that are sent over the streaming path to the client), the streaming protocol may allow dynamic adaption of the representation during streaming of the segments to a client.

The content processing device may comprise a configuration module 626, which is configured for determining one or more configuration parameters 634,635 on the basis of QoS information. In one embodiment, one or more configuration parameters may be used for adapting the size of the play-out buffer. This way the buffer size may be controlled on the basis of quality metrics associated with the streaming path 616. Further, in another embodiment, one or more configuration parameters 635 may be used by the segment request function 625 in the client in order to determine the first segment that needs to be requested when joining a live streaming event.

A monitoring system 628 may receive quality metrics from one or more monitoring agents. A device monitoring agent 624 may be configured to collect device quality metrics from the client 604, the receiving buffer 618, the play-out buffer 520 and the media engine 622 and to send these device quality metrics to a monitoring system 628 associated with the server system.

A network monitoring agent may be configured to collect quality metrics from the network and to correlate the metrics with a particular streaming path. On the basis of the quality metrics, the monitoring system may determine quality of service information associated with stream path between the client and the streaming server and store the quality metrics in a quality database 632 (in a similar way as described with reference to FIG. 1). When sufficient data are collected, reliable quality metrics may be collected in a QoS client profile in the database.

The quality metrics in a QoS client profile may be used by the configuration module in the content processing device in order to set the play-out buffer to a certain size and/or to configure the segment request function so that play-out delays are reduced.

In this particular embodiment, the QoS information (and/or the quality metrics and/or the configuration parameters) is not sent to the client on the basis of the manifest file (as described in detail with reference to FIG. 3-5). Instead, a separate (bi-directional) communication channel 636 between the quality database (or the monitor system associated with the quality database) and the configuration module (or the client associated with the configuration module) may be established and used to transmit at least part of the QoS information to the configuration module. In one embodiment, the communication channel may be set-up when the client joins a particular (live) streaming event.

In an embodiment, when joining a (live) streaming event, the client may receive a manifest file comprising location information, e.g. an URL caqd.example.com/, of a quality database, for example a Client Access-line Quality Database (CAQD) which may comprise a QoS client profile comprising quality metrics, QoS information and/or configuration parameters associated with the streaming path.

Figure 7:
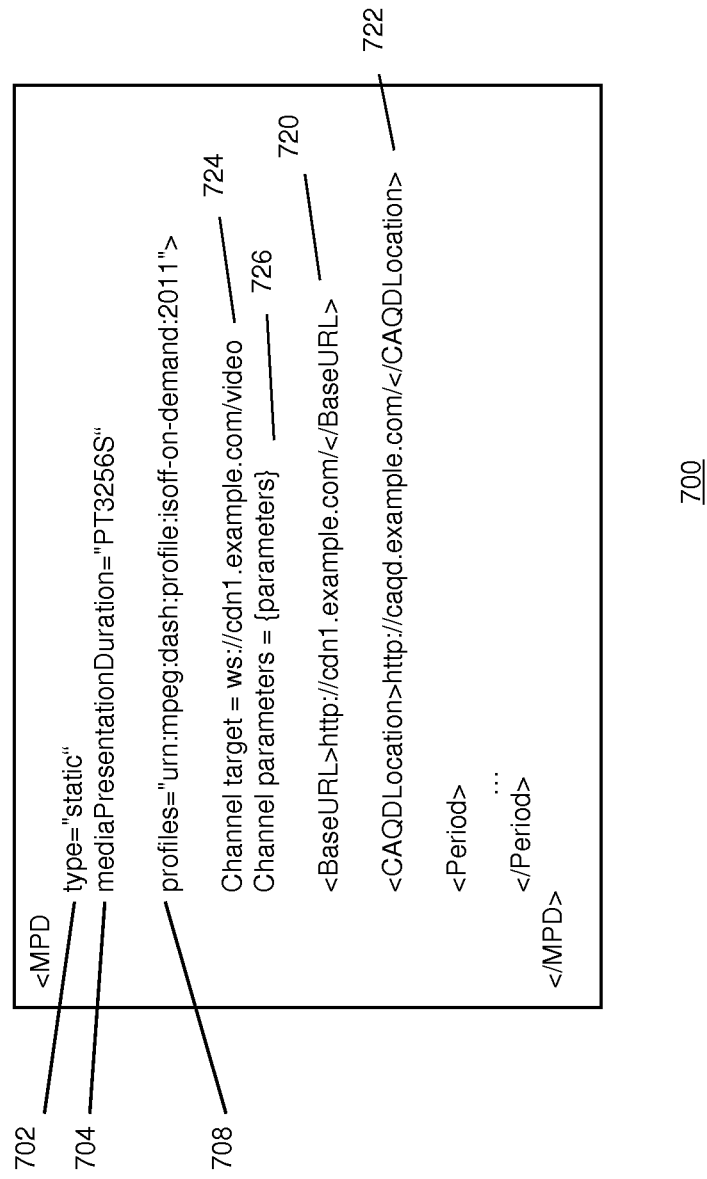
FIG. 7 depicts a process for delivering segments to a client according to another embodiment of the invention.

An embodiment of such manifest file is depicted in FIG. 7 wherein at least part of the manifest file may comprise similar information as described with reference to FIG. 3, including: a manifest type indicator 702 for indicating whether the manifest file is a static manifest file, which does not change in time, or a dynamic manifest file, which may change in time; a segment presentation duration parameters "mediaPresentationDuriation" 704, segment location information 720, and media metadata, e.g. a profile parameter 708.

In addition, the manifest file may comprise location information, e.g. an URL caqd.example.com/ </CAQDLocation>, of a quality database, which may be used by the configuration module in the content processing device in order to request QoS information and/or quality metrics and/or configuration parameters from the quality database.

In a further embodiment, the manifest file may comprise channel set-up information 724,726 for setting up a communication channel, in particular a (bi-directional) HAS control channel, associated with the streaming path. In one embodiment, the channel set-up information may comprise a channel target parameter 724 providing a reference to the network node comprising a streaming control function. Further, in another embodiment, the channel set-up information may comprise channel parameters 1402, i.e. parameters used by the streaming control function/control channel server function. For example, in the case of WebSocket the parameters may refer to the use of WebSocket sub-protocols, WebSocket version, etc. The set-up and use of a HAS control channel is described in more detail with reference to FIG. 9.

Figure 8:
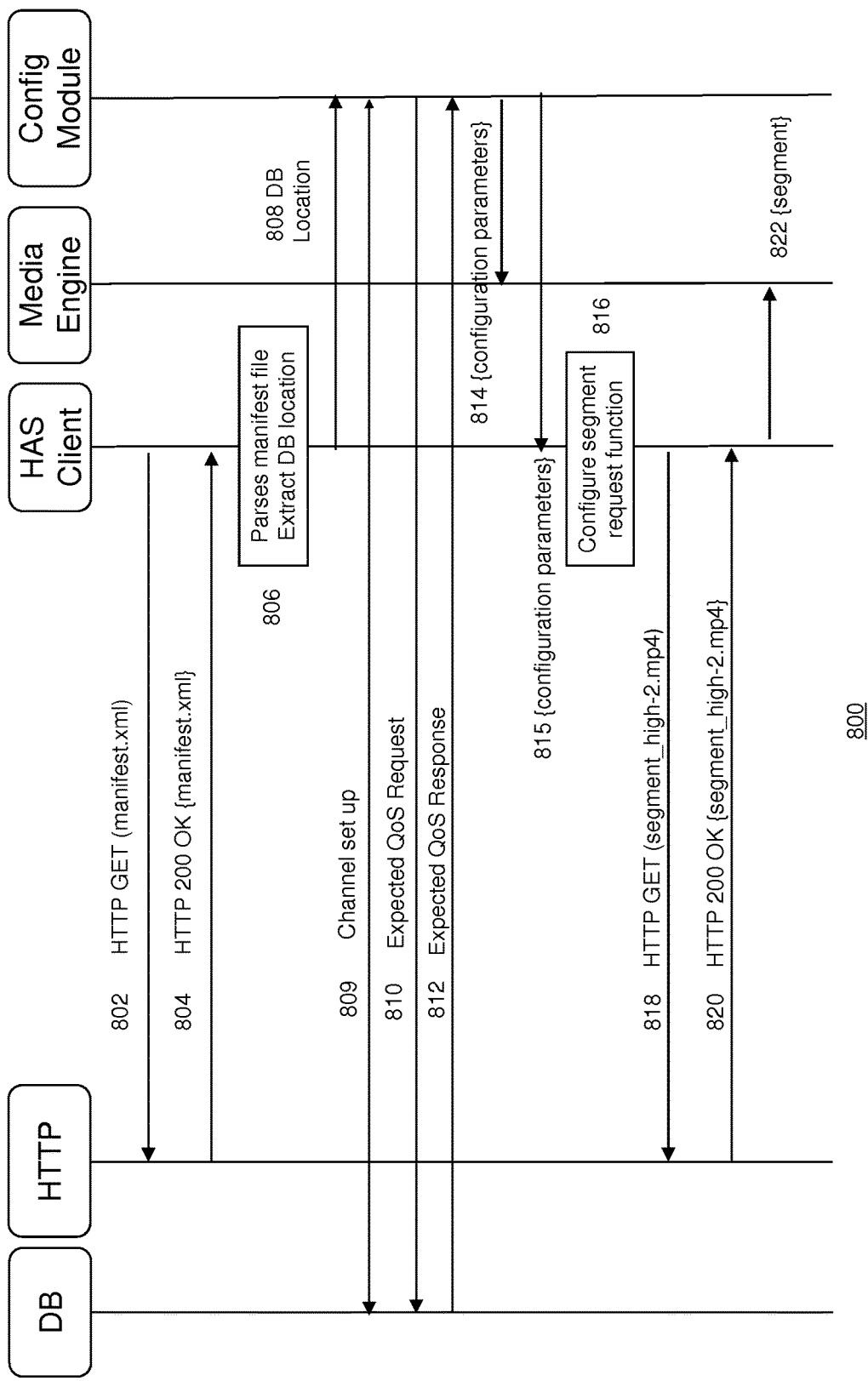
FIG. 8 depicts a process for collecting metrics according to an embodiment of the invention.

FIG. 8 depicts a process for delivering segments to a client according to another embodiment of the invention. In particular, FIG. 8 depicts a process for delivering segments to a client using a content delivery system as described with reference to FIGS. 6 and 7. The process may start with a client joining a (live) streaming event wherein the client may request a manifest file, using e.g. an HTTP request message, from a sever system and—in response—receive a manifest file in e.g. a HTTP response message (steps 802 and 804).

The client may then parse the manifest file and extract location information associated with a quality database from the manifest file (step 806). The location information, the URL of the quality database, may be forwarded to the configuration module (step 808), which may use the location information to set up a (bi-directional) communication channel between the quality database and the configuration module (or the HAS client associated with the configuration module). After establishing the communication channel, the configuration module may query the quality database for QoS information (step 810), in particular for information regarding an expected QoS of the streaming path. The configuration module may receive the QoS information in a response and use the QoS information in order to determine configuration parameters, e.g. preconfigured configuration parameters in the configuration module, on the basis of the QoS information comprising a predetermined QoS level, e.g. a low-latency mode.

The configuration module may send one or more configuration parameters for configuring the play-out buffer associated with the media engine (step 814). Further, the configuration module may send one or more configuration parameters to a segment request function in the client (step 815), which may use parameters to determine which (first) segment should requested upon joining a live streaming event (step 816).

Thereafter, the HAS client may start the streaming process, by requesting the (first) segment that is determined on the basis of the one or more second configuration parameters and receiving the requested segment in a response (steps 818 and 820 respectively).

Figure 9:
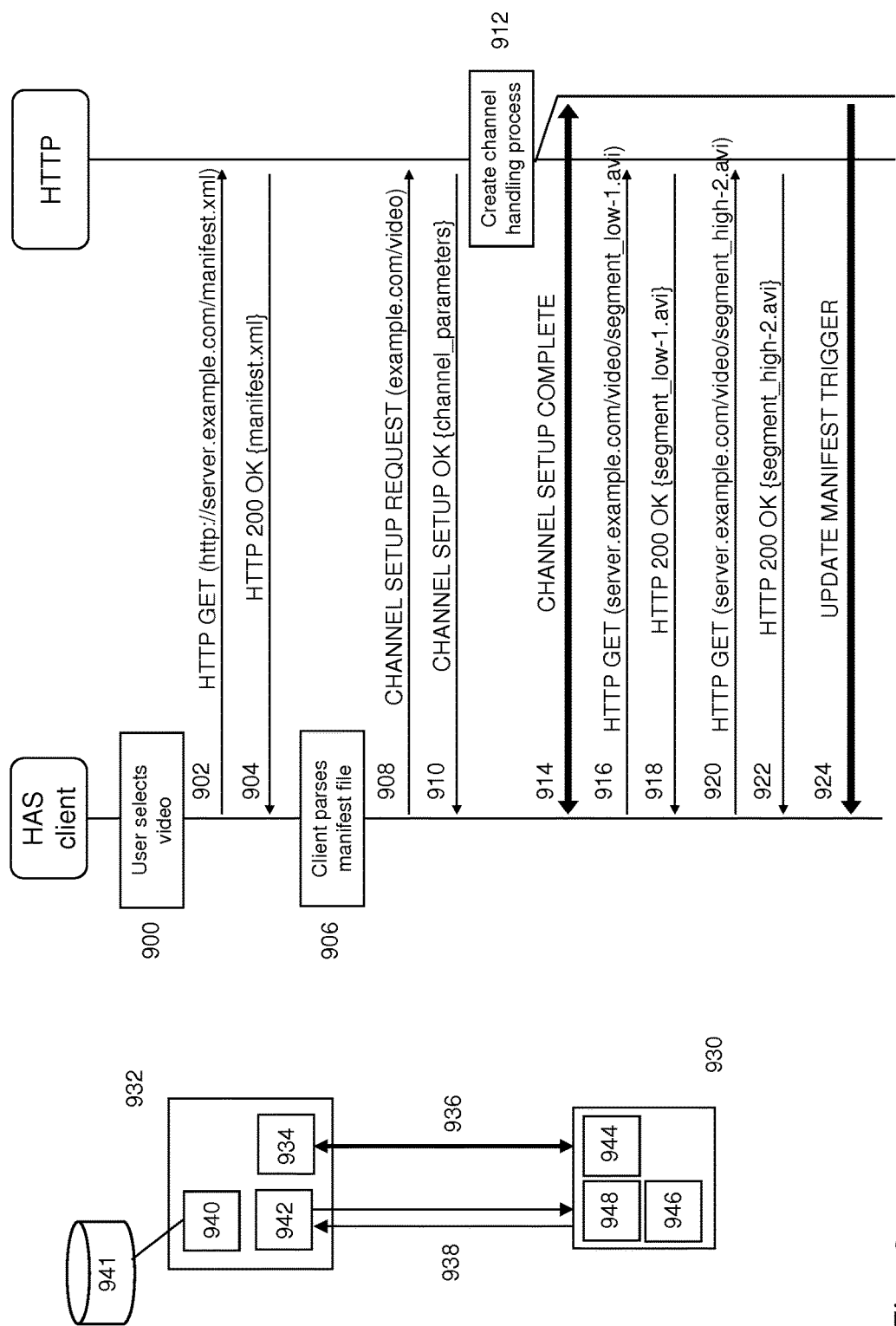
FIG. 9 depicts a protocol flow between the content processing device and the server according to an embodiment of the invention.

FIG. 9 depicts a protocol flow between the content processing device 930 and the server system 932 for setting up a bi-directional HAS control channel according to an embodiment of the invention. The content processing device may comprise a HAS client 948 and a media engine 946 (similar or identical to the ones described with reference to FIGS. 1 and 6). Similarly, the server system may comprise an HTTP streaming function 942 for streaming content to the HAS client and a monitoring system 940 connected to a quality database 941 comprising client QoS profiles (similar or identical to those described with reference to FIGS. 1 and 6).

The content processing device and the server system may further comprise control channel client function (CCCF) 944 and a control channel server function (CCSF), e.g. a HAS control channel server function 934 respectively, which are configured to establish a streaming control channel 936 between the CCSF and the CCCF 944. Here, the streaming control channel may be used to exchange streaming control information between the client and the server. In particular, the streaming control channel may be used to send streaming control information originating from the server system to the client during the streaming of segmented content 938 to the client. For example, in one embodiment, the streaming control channel may be used to send an update manifest trigger from the server system (or the monitoring system) to the CCCF so that the client will send a request for a manifest file (or an manifest update) to the server system.

Here, the process may start in similar ways as described above with reference to the other processes, e.g. a user joining a live streaming event (step 900). The client may send an HTTP GET request to obtain a manifest file from the server system, which may respond to the request by sending a manifest file to the client (step 902,904).

The CCSF in the server is configured to insert channel set-up information in the manifest file, which allows the CCCF in the client and the CCSF in the server to set up a streaming control channel. Hence, during parsing of the manifest file (step 906), the channel set-up information may be extracted from the manifest file (see e.g. FIG. 7) and used by the CCCF in the content processing device to send channel setup request to the CCSF in the server (step 908) for setting up a server-to-client streaming control channel.

In one embodiment, the CCCF and the CCSF may comprise an HTTP WebSocket API configured to use the WebSocket protocol and the channel set-up information to set up a streaming control channel between the client and the server. The WebSocket connections typically use standard HTTP ports 80 and 443 so that data may easily transfer firewalls and NATs, but also other ports may be used.

The use of the WebSocket protocol has several advantages within the context of CDN and HAS, such as a low message overhead for scalability, the use of the HTTP for protocol convergence and traversal of firewalls, and possibility for tunnelling of other protocols. In another embodiment, the Session Initiation Protocol (SIP) (http://tools.ietf.org/html/rfc3261) may be used, where the client may comprise a SIP User Agent and the server is a SIP Application Server.

In yet another embodiment, the Extensible Messaging and Presence Protocol (XMPP) (http://www.ietf.org/rfc/rfc3920.txt) is used, where the client may comprise an XMPP client and the server comprises an XMPP server.

Both the SIP and XMPP protocol messages may be tunnelled over a WebSocket according to draft-ibc-rtcweb-sip-websocket-00 and draft-moffitt-xmpp-over-websocket-00.

During set-up of the streaming control channel, channel parameters may be exchanged between the CCCF and CCSF (step 910). Furthermore, in order to handle messages originating from the client, the CCSF may create a dedicated channel handling process (thread) (step 912). Once the streaming control channel is established 914, the client may start the process of streaming segments identified in the manifest file. The streaming process may be based on a HAS-type streaming protocol and start with a HTTP GET request comprising an URL associated with the first segment segment_low-1.avi (step 916). Once the delivery of the first segment is confirmed by a HTTP 200 OK response (step 918), the client may request a subsequent segment segment_high-2.avi (steps 920,922).

Then, the CCSF in the server system may decide that it is necessary for the client to update its manifest file. For example, the CCSF may have received a message from the monitoring system that the QoS level of the streaming path has substantially changed so that a modification of the size of the play-out buffer may be desired. It therefore may send a manifest update signal over the streaming control channel (step 924). In one embodiment, the update signal may include an URL pointing to a new manifest file comprising new QoS information. Upon receiving the manifest file update signal, the CCCF may request the new manifest file. Upon reception of the new manifest file comprising the new QoS information, the client may send the QoS information to the configuration module, which subsequently reconfigures the play-out buffer on the basis of the received QoS information. The streaming of the segments to the client may be continued on the basis of the reconfigured play-out buffer. In the same way, the segment request function may be reconfigured on the basis of the QoS information.

In another embodiment, instead of sending the QoS information in a manifest file to the client, (at least part of) the QoS information may be sent via the HAS control channel to the client.

In one embodiment, instead of transferring the channel set-up information in the manifest file, the channel set-up information may be pre-installed into the terminal or may be retrieved via a separate communication channel from another (network) source. In that case, when the client receives the manifest file, it triggers the streaming control channel client function to retrieve the channel set-up information in order to establish a streaming control channel as described with reference to FIG. 9 steps 908-914.

In another embodiment, the server system may be configured to stream segments to multiple clients, wherein each client is associated with its own streaming control channel in order to enable network-initiated, e.g. server-initiated, control as described with reference to FIG. 9. This way, the server system may control the streaming of segmented content to multiple clients on the basis of quality metrics, which is stored in the quality database. When the monitoring system 940 associated with the server system detects a change in the QoS of the network, it may signal the CCSF to initiate a manifest file update wherein (at least part of the) HAS clients are provided with a new manifest file comprising new QoS information which may be used to reconfigure the play-out buffer to an appropriate size.

It is submitted that the figures depict non-limiting examples of the invention and that the embodiments described with reference to these figures may be combined with each other without departing the invention. For example, in an embodiment, a first part of the QoS information, quality metrics and/or configuration parameters may be sent to the content processing device using the manifest file (as described with reference to FIG. 1-4 and another part of the QoS information, quality metrics and/or configuration parameters may be sent via a separate communication channel (as described with reference to FIG. 6-9). Hence, in that case, the manifest file may comprise both QoS information, quality metrics and/or configuration parameters (as described with reference to FIG. 3), location information, e.g. an URL, associated with a quality database, which comprises a QoS client profile of the streaming path; and/or channel set-up information for setting up a HAS control channel (as described with reference to FIG. 7).

Figure 14:
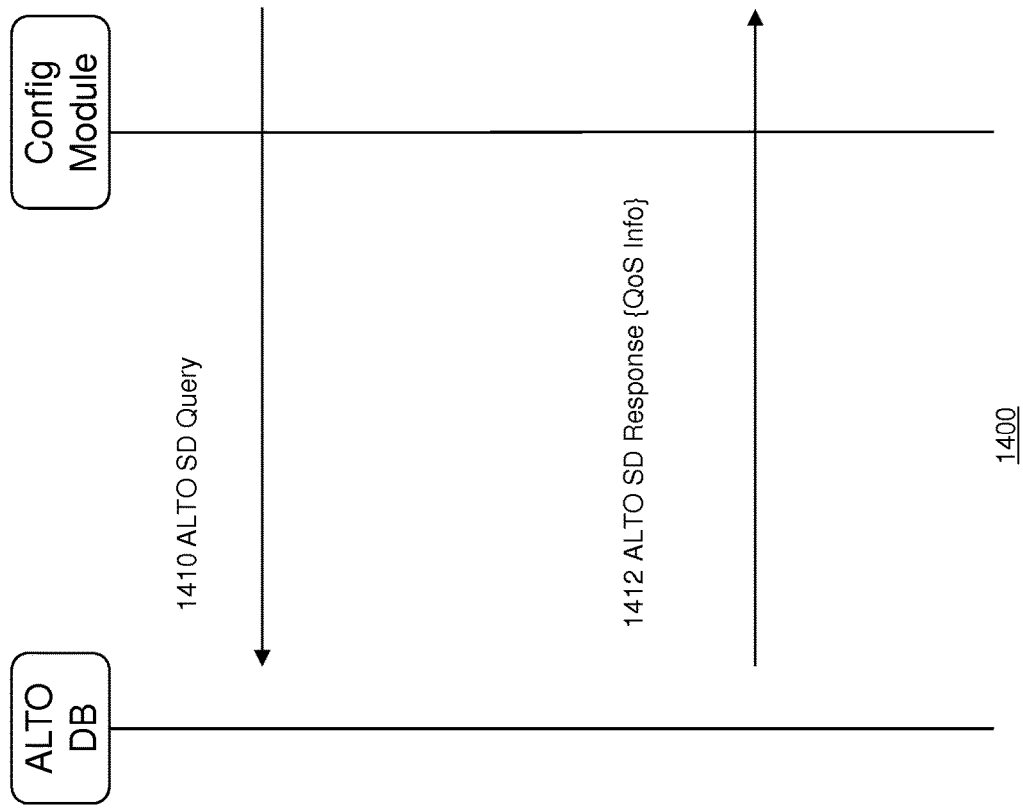
FIG. 14 depicts a protocol flow for requesting Quality of Service information based on the ALTO protocol, according to an embodiment of the invention

FIG. 14 describes the embodiment wherein the HAS client, preferably the configuration module of the HAS client (device), comprises an ALTO client functionality and uses the ALTO protocol to query (1410) an ALTO server/database in the network for QoS information. The ALTO server/database, comprising ALTO server functionality may then provide a response (1412), including said QoS information. On the basis of the received QoS information, the play-out buffer (parameters) may be (re-) configured.

Further, while the embodiments in the figures are described with reference to the configuration of a play-out buffer, the invention can be applied to any type of buffer in the content processing device (e.g. receiving buffer, decoding buffer, etc.) that contributes to the play-out delay.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system.

The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The invention is not limited to the embodiments described above, which may be varied within the scope of the accompanying claims.

The invention claimed is:

1. Method for enabling low-latency streaming of segments via a network to a HTTP Adaptive Streaming (HAS) client in a content processing device, said client being configured to request and receive segments from a server system on the basis of a manifest file, said segments identified in said manifest file, said method comprising:
   collecting, at a monitoring system in said network, quality metrics associated with one or more streaming paths between said client and one or more streaming servers in said server system and storing said quality metrics in a quality database in said network;
   determining quality of service information on the basis of said quality metrics, said quality of service information defining one or more QoS levels;

providing the content processing device with the quality of service information; and on the basis of said quality of service information, configuring, at a configuration module in said content processing device, using at least one of one or more configuration parameters, a buffer in said content processing device and/or a segment request function in said content processing device, the one or more configuration parameters comprising:

at least one buffer size parameter for determining a minimum size of the buffer before play-out of data in said buffer is started; and/or, at least one segment request parameter for determining a first segment selected from segments identified in said manifest file that the segment request function will request from said streaming server.

2. Method according to claim 1 comprising:

wherein said one or more QoS levels comprise at least a low latency level associated with one or more preconfigured configuration parameters for configuring the client in a low-latency mode and a high latency level associated with one or more preconfigured configuration parameters for configuring the client in a high-latency mode.

3. Method according to claim 1, wherein at least part of said quality of service information is determined by said monitoring system and stored in said quality database.

4. Method according to claim 1, wherein said providing comprises sending said quality of service information to said content processing device, said quality of service information enabling the configuration module to determine one or more configuration parameters for the buffer and/or for the segment request function in said content processing device.

5. Method according to claim 1 wherein said providing comprises:

the client requesting at least part of a manifest file or a manifest file update from said server system;

said server system retrieving said quality of service information from said quality database and sending a manifest file comprising said quality of service information to said client.

6. Method according to claim 1 wherein at least part of said quality of service information is sent over a streaming control channel to said client.

7. Method according to claim 6 comprising:

providing said client with channel set-up information for setting up a (bi-directional) streaming control channel between said server system and said client, establishing said (bi-directional) streaming control channel on the basis of said channel set-up information.

8. Method according to claim 1 comprising:

at least a first monitoring agent in said content processing device collecting first metrics associated with said content processing device; and/or, at least a second monitoring agent in said network collecting second metrics associated with at least part of said network;

on the basis of said first and/or second metrics said monitoring system determining quality metrics associated with one or more streaming paths between said one or more streaming servers in said server system and said client; and, storing said quality metrics in said quality database.

9. A content delivery system for enabling low-latency streaming of segments over at least one network to a content processing device, said system comprising:

a content processing device comprising a HTTP Adaptive Streaming (HAS) client, wherein said client is configured to request and receive segments from one or more streaming servers on the basis of a manifest file;

said content processing device further configured for being provided with quality of service information determined on the basis of at least part of stored quality metrics, said quality of service information defining one or more QoS levels;

a monitoring system configured for collecting quality metrics associated with one or more paths between said client and said one or more streaming servers and storing quality metrics in a quality database in said network; and, a configuration module in said content processing device arranged to use at least one or more configuration parameters for configuring a buffer in said content processing device; and/or, for configuring a segment request function in said content processing device on the basis of said quality of service information, the one or more configuration parameters comprising:

at least one buffer size parameter for determining a minimum size of the buffer before play-out of data in said buffer is started; and/or, at least one segment request parameter for determining a first segment selected from segments identified in said manifest file that the segment request function will request from said streaming server.

10. A configuration module for use in a content processing device, said configuration module being configured for enabling low-latency streaming to a HTTP Adaptive Streaming (HAS) client in said content processing device, wherein said client is configured to request and receive segments from one or more streaming servers in a server system on the basis of a manifest file, wherein said configuration module is further configured for:

using one or more configuration parameters to configure a buffer in said content processing device and/or a segment request function in said content processing device on the basis of quality of service information determined on the basis of quality metrics, said quality of service information defining one or more QoS levels and wherein said quality metrics are associated with one or more streaming paths between said client and one or more streaming servers in said server system and wherein said quality metrics are collected by a monitoring system in said network and stored in a quality database in said network, said one or more configuration parameters comprising:

at least one buffer size parameter for determining a minimum size of the buffer before play-out of data in said buffer is started; and/or, at least one segment request parameter for determining a first segment selected from segments identified in said manifest file that the segment request function will request from said streaming server.

11. A configuration module according to claim 10, wherein said buffer is configured on the basis of one or more configuration parameters for determining a minimum size of the buffer before play-out of data in said buffer is stated; and/or, wherein said segment request function is configured on the basis of one or more configuration parameters for determining a first segment selected from segments identified in said manifest file that the segment request function will request from said streaming server.

12. A non-transitory storage medium comprising a manifest file for use by a HTTP Adaptive Streaming (HAS) client in a content processing device, wherein said client is configured to request and receive segments from at least one server on the basis of said manifest file, said manifest file enabling low-latency streaming to said client, said manifest file comprising one or more segment identifiers and segment play-out information; and wherein said manifest file further comprises quality of service information comprising one or more QoS levels associated with a streaming path between said client and a streaming server, wherein said quality of service information enables a configuration module associated with said client to determine one or more configuration parameters for a buffer and/or for a segment request function in said content processing device.

13. Non-transitory storage medium comprising a computer program product, the computer program product comprising software code portions configured for, when run in the memory of a computer, executing the method steps according to claim 1.

14. Method according to claim 6 wherein said streaming control channel is a Web Socket based streaming control channel.

15. A content delivery system according to claim 9,
wherein said buffer is configured on the basis of one or more configuration parameters for determining a minimum size of the buffer before play-out of data in said buffer is stated; and/or,
wherein said segment request function is configured on the basis of one or more configuration parameters for determining a first segment selected from segments identified in said manifest file that the segment request function will request from said streaming server.

* * * * *